US012063155B2

United States Patent
He et al.

(10) Patent No.: US 12,063,155 B2
(45) Date of Patent: Aug. 13, 2024

(54) PACKET SENDING METHOD AND APPARATUS, AND STORAGE MEDIUM

(71) Applicant: HUAWEI TECHNOLOGIES CO., LTD., Guangdong (CN)

(72) Inventors: Hongwei He, Nanjing (CN); Yonglong Fang, Nanjing (CN); Qi Yu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/859,387

(22) Filed: Jul. 7, 2022

(65) Prior Publication Data

US 2022/0345400 A1     Oct. 27, 2022

Related U.S. Application Data

(63) Continuation of application No. PCT/CN2020/120447, filed on Oct. 12, 2020.

(30) Foreign Application Priority Data

Jan. 8, 2020   (CN) .......................... 202010019654.4

(51) Int. Cl.
    *H04L 45/00*   (2022.01)
    *H04L 12/46*   (2006.01)
(52) U.S. Cl.
    CPC .......... *H04L 45/38* (2013.01); *H04L 12/4633* (2013.01); *H04L 45/566* (2013.01)

(58) Field of Classification Search
    None
    See application file for complete search history.

(56) References Cited

U.S. PATENT DOCUMENTS

| | | | |
|---|---|---|---|
| 8,199,654 B2* | 6/2012 | Francisco | H04L 43/00 |
| | | | 709/224 |
| 9,407,545 B1* | 8/2016 | Ghosh | H04L 45/586 |
| 10,693,783 B2* | 6/2020 | Agarwal | H04L 45/66 |
| 11,029,982 B2* | 6/2021 | Chandrashekhar | H04L 45/741 |
| 11,425,021 B2* | 8/2022 | Goliya | H04L 45/021 |

(Continued)

FOREIGN PATENT DOCUMENTS

| | | |
|---|---|---|
| CN | 108111432 A | 6/2018 |
| CN | 108259350 A | 7/2018 |

(Continued)

*Primary Examiner* — Phyllis A Book
(74) *Attorney, Agent, or Firm* — HUAWEI TECHNOLOGIES CO., LTD.

(57) ABSTRACT

A first network device of a plurality of network devices is provided. The first network device is configured to receive a first data packet from a second site; search a flow table stored in the first network device for a target flow entry whose flow identifier is of a first data flow, each entry comprises a flow identifier and a corresponding outbound interface identifier, the target flow entry is created when the first site sends a second data flow to the second site, a source address of the second data flow is a destination address of the first data flow, and a destination address of the second data flow is a source address of the first data flow; and if the target flow entry is found, send the first data packet through an interface corresponding to an outbound interface identifier in the target flow entry.

17 Claims, 8 Drawing Sheets

(56) References Cited

U.S. PATENT DOCUMENTS

| | | | |
|---|---|---|---|
| 11,483,175 B2 * | 10/2022 | Subramaniyam | H04L 12/4641 |
| 2015/0188815 A1 | 7/2015 | Liu et al. | |
| 2016/0006654 A1 | 1/2016 | Fernando et al. | |
| 2016/0080230 A1 * | 3/2016 | Anand | H04L 41/0668 |
| | | | 709/224 |
| 2016/0080261 A1 | 3/2016 | Koponen et al. | |
| 2018/0048593 A1 * | 2/2018 | Tian | H04L 41/0895 |
| 2019/0045034 A1 * | 2/2019 | Alam | H04W 40/24 |
| 2019/0140940 A1 | 5/2019 | Shah | |
| 2019/0394066 A1 * | 12/2019 | Lin | H04L 45/245 |

FOREIGN PATENT DOCUMENTS

| | | | | |
|---|---|---|---|---|
| CN | 108471374 A | | 8/2018 | |
| CN | 108989175 A | | 12/2018 | |
| CN | 109412927 A | | 3/2019 | |
| CN | 109936492 A | | 6/2019 | |
| EP | 2930892 B1 * | | 11/2017 | G06F 11/008 |
| EP | 3337109 A1 | | 6/2018 | |
| JP | 2008512971 A | | 4/2008 | |
| JP | 2012054731 A | | 3/2012 | |
| WO | 2012049925 A1 | | 4/2012 | |
| WO | WO-2012049925 A1 * | | 4/2012 | H04L 45/38 |
| WO | WO-2013020126 A1 * | | 2/2013 | F02P 9/002 |
| WO | 2014067316 A1 | | 5/2014 | |
| WO | 2019120233 A1 | | 6/2019 | |

* cited by examiner

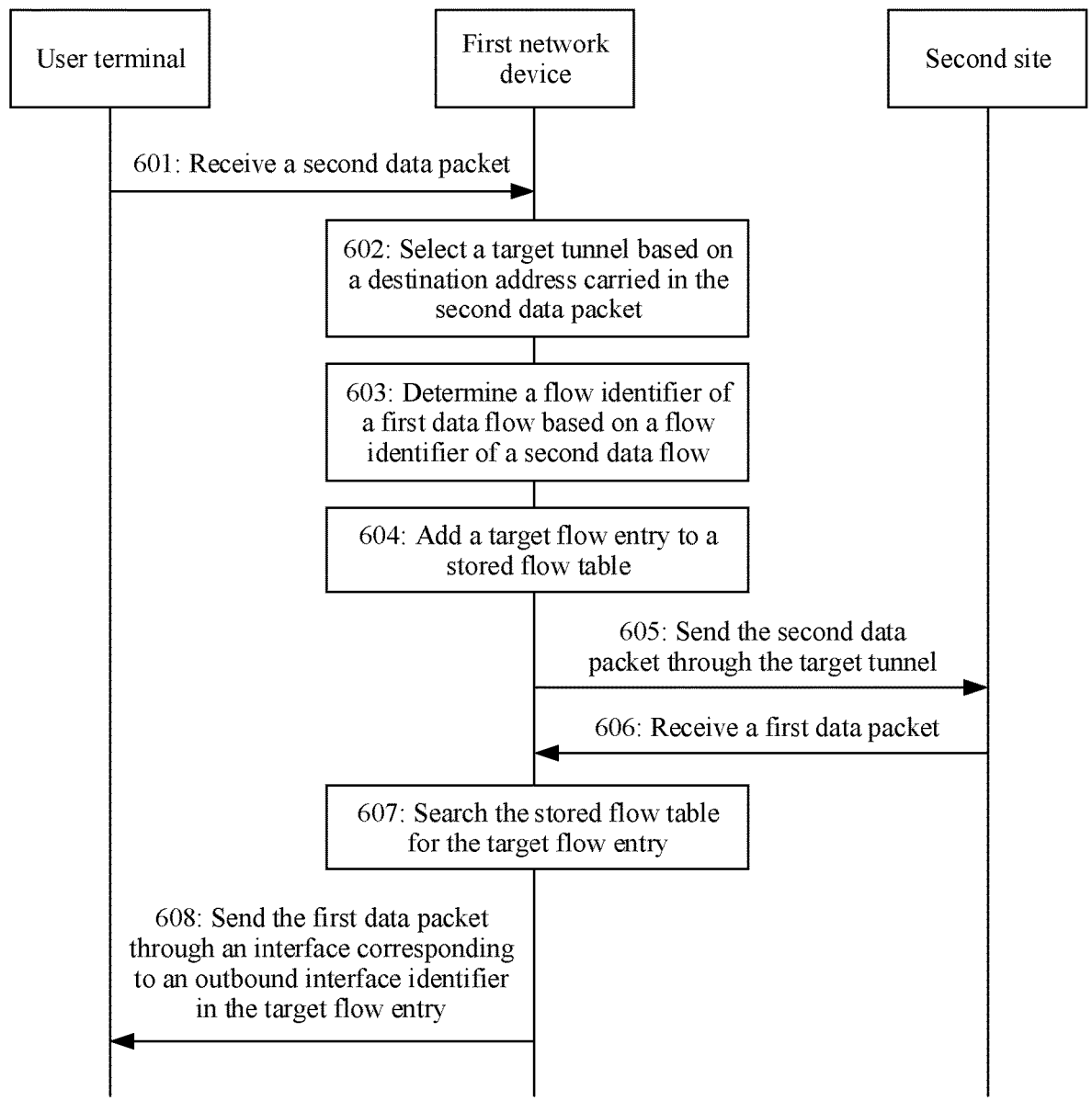

PACKET SENDING METHOD AND APPARATUS, AND STORAGE MEDIUM

CROSS-REFERENCE TO RELATED APPLICATIONS

This application is a continuation of International Application No. PCT/CN2020/120447, filed on Oct. 12, 2020, which claims priority to Chinese Patent Application No. 202010019654.4, filed on Jan. 8, 2020. The disclosures of the aforementioned applications are hereby incorporated by reference in their entireties.

TECHNICAL FIELD

This application relates to the field of communications technologies, and in particular, to a packet sending method and apparatus, and a storage medium.

BACKGROUND

A software-defined wide area network (SD-WAN) is an important practice of software-defined networking (SDN). In the SD-WAN, a tunnel may usually be established between network devices in two sites by using an overlay technology, so as to send a packet through the tunnel. In addition, these network devices may further identify, through deep packet inspection (DPI), an application type to which the packet belongs, so as to send the packet based on the application type. However, to ensure communication reliability, two network devices are usually deployed in some important sites. In addition, for the DPI, an application type can be successfully identified only when a packet sent and a packet received with respect to a same application pass through a same network device. Therefore, in this case, how to ensure interworking between the two network devices, and how to ensure that the packet sent and the packet received with respect to the same application pass through the same network device currently become urgent to-be-resolved problems.

SUMMARY

This application provides a packet sending method and apparatus, and a storage medium, to resolve a problem that when a plurality of network devices are deployed in a site, it cannot be ensured that a packet sent and a packet received with respect to a same application pass through a same network device. Technical solutions are as follows:

According to a first aspect, a packet sending method is provided. A plurality of network devices are deployed in a first site. A plurality of tunnels are established between the network devices deployed in the first site and a network device deployed in a second site. The second site is a site that performs data transmission with the first site. In this case, a first network device receives a first data packet from the second site; the first network device searches a flow table stored in the first network device for a target flow entry whose flow identifier is a flow identifier of a first data flow; and if the target flow entry is found, the first network device sends the first data packet through an interface corresponding to an outbound interface identifier in the target flow entry.

The first network device is any one of the plurality of network devices. The flow table includes a plurality of flow entries, and each of the plurality of flow entries includes a flow identifier and a corresponding outbound interface identifier. The first data flow is a data flow to which the first data packet belongs. The target flow entry is created when the first site sends a second data flow to the second site. A source address of the second data flow is a destination address of the first data flow, and a destination address of the second data flow is a source address of the first data flow.

In this application, when receiving the first data packet from the second site, the first network device may search the flow table for the target flow entry whose flow identifier is the flow identifier of the first data flow. The first data flow is the data flow to which the first data packet belongs. The target flow entry is created when the first site sends the second data flow to the second site. The source address of the second data flow is the destination address of the first data flow, and the destination address of the second data flow is the source address of the first data flow. Therefore, the target flow entry exists in the flow table of the first network device only when the second data flow passes through the first network device. Only in this way, can the first network device find the target flow entry, and then send the first data packet through the interface corresponding to the outbound interface identifier in the target flow entry. It can be learned that, in this application, it can be ensured that a packet sent and a packet received with respect to a same application pass through a same network device.

Optionally, after the first network device searches the flow table stored in the first network device for the target flow entry whose flow identifier is the flow identifier of the first data flow, if the target flow entry is not found, and a network device that does not search for the target flow entry still exists in the plurality of network devices, the first network device sends the first data packet to a second network device, to indicate the second network device to search a flow table stored in the second network device for the target flow entry, where the second network device is a network device that does not search for the target flow entry in the plurality of network devices. If the target flow entry is not found, and the plurality of network devices all search for the target flow entry, the first network device sends the first data packet through a local route.

In an example, every two of the plurality of network devices in the first site may be connected through a network link, that is, every two network devices may communicate with each other. In this case, the first data packet may carry a device identifier of each network device through which the first data packet passes. In this way, when determining whether the network device that does not search for the target flow entry still exists in the first site, the first network device may determine, based on the device identifier of the network device carried in the first data packet, the network device that does not search for the target flow entry in the plurality of network devices in the first site.

It should be noted that each network device in the first site stores a local route, and the local route stores routing information between the corresponding network device and the user terminal in the first site. Therefore, after the first network device receives the first data packet, and the plurality of network devices in the first site all search for the target flow entry, the first network device may send the first data packet to the user terminal in the first site based on the local route.

Optionally, when the first network device sends the first data packet through the interface corresponding to the outbound interface identifier in the target flow entry, if the interface corresponding to the outbound interface identifier in the target flow entry is a first-type interface, the first network device sends the first data packet to the user terminal in the first site through interface corresponding to the outbound interface identifier in the target flow entry. Alternatively, if the interface corresponding to the outbound interface identifier in the target flow entry is a second-type interface, the first network device sends the first data packet to a third network device through the interface corresponding to the outbound interface identifier in the target flow entry, to indicate the third network device to search a flow table stored in the third network device for the target flow entry.

The first-type interface is an interface for communicating with the user terminal in the first site. The second-type interface is an interface for communicating with another network device in the plurality of network devices. The third network device is a device in the plurality of network devices that communicates with the first network device through the interface corresponding to the outbound interface identifier in the target flow entry.

Optionally, before the first network device receives the first data packet from the second site, the first network device receives a second data packet from the user terminal in the first site, the first network device selects a tunnel from the plurality of tunnels as a target tunnel based on a destination address, the first network device determines the flow identifier of the first data flow based on a flow identifier of the second data flow, the first network device adds the target flow entry to the flow table stored in the first network device, and if the target tunnel is a tunnel established between the first network device and the network device in the second site, the first network device sends the second data packet through the target tunnel.

The second data packet carries the destination address, and the second data packet belongs to the second data flow. The flow identifier in the target flow entry currently added by the first network device is the flow identifier of the first data flow. The outbound interface identifier in the currently added target flow entry is an identifier of a first interface, and the first interface is an interface that is in the first network device and that is configured to receive the second data packet from the user terminal in the first site.

It should be noted that, because the second data packet belongs to the second data flow, and the second data flow is a data flow sent by the user terminal in the first site to a user terminal in the second site, the destination address carried in the second data packet is a destination address of the user terminal in the second site.

It should be noted that, when the user terminal in the first site sends the second data packet to the user terminal in the second site, because the two user terminals belong to different sites, the user terminal in the first site needs to send the second data packet to a network device in the first site, to send the second data packet to the network device in the second site through the network device, and then the network device in the second site sends the second data packet to the user terminal in the second site.

In an example, the user terminal in the first site may select a network device from the plurality of network devices in the first site as the first network device based on a networking manner of the first site, and then send the second data packet to the first network device, to send the second data packet to the network device in the second site through the first network device.

Optionally, the first network device stores a routing table, the routing table includes a plurality of routing entries, and each of the plurality of routing entries includes a site prefix and a corresponding site identifier. In this way, when the first network device selects a tunnel from the plurality of tunnels as the target tunnel based on the destination address, the first network device determines a target routing entry from the routing table based on the destination address, where the destination address matches a site prefix included in the target routing entry. The first network device determines one or more tunnel entries based on a site identifier included in the target routing entry, where the one or more tunnel entries are tunnel entries corresponding to the tunnels established between the first site and the second site. The first network device selects a tunnel entry from the one or more tunnel entries as a target tunnel entry, and uses a tunnel corresponding to the target tunnel entry as the target tunnel.

In this application, because the site prefix refers to a network segment corresponding to a site, the destination address carried in the second data packet may be matched with the site prefix included in each routing entry in the routing table, to determine the target routing entry from the routing table.

It should be noted that, based on the foregoing descriptions, the destination address carried in the second data packet is the address of the user terminal in the second site. Therefore, the site prefix included in the target routing entry is a site prefix of the second site, and the site identifier included in the target routing entry is an identifier of the second site.

In this application, the first network device may store one tunnel table, and the tunnel table is used to store tunnel entries corresponding to a plurality of sites. The first network device may alternatively store a plurality of tunnel tables, and the plurality of tunnel tables are in a one-to-one correspondence with the plurality of sites. The plurality of sites refer to sites that establish tunnels with the first site, and the plurality of sites include the second site. For the two cases, manners of determining the one or more tunnel entries by the first network device are different. Therefore, the following provides descriptions for the two cases.

In the first case, the first network device stores one tunnel table. In this case, the first network device may determine one or more tunnel identifiers based on the site identifier included in the target routing entry, where the one or more tunnel identifiers are identifiers of the tunnels established between the first site and the second site. Then, the first network device may determine the one or more tunnel entries from the tunnel table based on the one or more tunnel identifiers.

It should be noted that regardless of how many tunnel tables are stored in the first network device, each tunnel table may include a plurality of tunnel entries, and each of the plurality of tunnel entries may include a tunnel identifier and corresponding tunnel attribute information. The tunnel attribute information may include a tunnel encapsulation manner, a source address and a destination address of a tunnel, whether the tunnel is available, bandwidth of the tunnel, a delay of the tunnel, and the like. In addition, in some cases, the first network device may store a first mapping relationship between a site identifier and a tunnel identifier. The first mapping relationship stores an identifier of each site that establishes the tunnel with the first site, and an identifier of the tunnel established between each site and the first site. In this way, the first network device may determine the one or more tunnel identifiers from the first mapping relationship based on the site identifier included in the target routing entry. Then, the first network device may determine, from the tunnel table, tunnel entries whose included tunnel identifiers are the same as the one or more tunnel identifiers, to obtain the one or more tunnel entries.

In the second case, the first network device stores a plurality of tunnel tables. In this case, the first network device may determine an identifier of a target tunnel table based on the site identifier included in the target routing entry. The target tunnel table is a tunnel table in the plurality of tunnel tables that corresponds to the second site. Then, the first network device may determine the target tunnel table from the plurality of tunnel tables based on the identifier of the target tunnel table, and determine tunnel entries stored in the target tunnel table as the one or more tunnel entries.

The first network device stores different tunnel tables for different sites, and the first network device may store a second mapping relationship between a site identifier and a tunnel table identifier. The second mapping relationship stores an identifier of each site that establishes the tunnel with the first site, and an identifier of the tunnel table corresponding to each site. In this way, the first network device may determine the identifier of the target tunnel table from the second mapping relationship based on the site identifier included in the target routing entry. Then, the target tunnel table may be determined from the plurality of tunnel tables based on the identifier of the target tunnel table, and the tunnel entries in the target tunnel table are further determined as the one or more tunnel entries.

After determining the one or more tunnel entries, the first network device may select a tunnel entry from the one or more tunnel entries as the target tunnel entry according to a tunnel selection policy, and further determine a tunnel corresponding to the target tunnel entry as the target tunnel, that is, use a tunnel identified by a tunnel identifier included in the target tunnel entry as the target tunnel.

Optionally, the flow identifier of the second data flow includes source port information and destination port information. When the first network device determines the flow identifier of the first data flow based on the flow identifier of the second data flow, the first network device obtains the flow identifier of the first data flow after exchanging the source port information and the destination port information in the flow identifier of the second data flow.

The first data flow is a data flow sent by the user terminal in the second site to the user terminal in the first site, and the second data flow is a data flow sent by the user terminal in the first site to the user terminal in the second site. Therefore, the source address of the first data flow is the destination address of the second data flow, and the destination address of the first data flow is the source address of the second data flow.

In this application, the first network device may determine the flow identifier of the second data flow based on the second data packet, and further determine the flow identifier of the first data flow based on the flow identifier of the second data flow.

In an example, the first network device may obtain tuple information of the second data packet, and the tuple information includes at least the source port information and the destination port information. The obtained tuple information is used as the flow identifier of the second data flow. Then, the first network device may exchange the source port information and the destination port information in the flow identifier of the second data flow, to obtain the flow identifier of the first data flow.

In another example, the first network device may obtain tuple information of the second data packet, and obtain the flow identifier of the second data flow from a stored correspondence between tuple information and a flow identifier based on the tuple information of the second data packet. Then, the flow identifier of the first data flow is obtained from a stored correspondence between the first data flow identifier and the second data flow identifier based on the flow identifier of the second data flow.

After determining the flow identifier of the first data flow based on the second data packet, the first network device may add the target flow entry to the flow table stored in the first network device. The flow table may include a plurality of flow entries, and each of the plurality of flow entries includes a flow identifier and a corresponding outbound interface identifier. Therefore, the currently added target flow entry includes a flow identifier and a corresponding outbound interface identifier. In addition, the flow identifier in the currently added target flow entry is the flow identifier of the first data flow, the outbound interface identifier in the currently added target flow entry is the identifier of the first interface, and the first interface is the interface that is in the first network device and that is configured to receive the second data packet from the user terminal in the first site.

It should be noted that, when a same data flow flows into the first network device, the data flow may flow into the first network device through the interface for communicating with the user terminal in the first site, or may flow into the first network device through the interface for communicating with another network device in the first site. Therefore, the outbound interface identifier in the target flow entry currently added by the first network device may be an interface that is in the first network device and that communicates with the user terminal in the first site, or may be an interface that is in the first network device and that communicates with another network device in the first site.

Optionally, after the first network device adds the target flow entry to the flow table stored in the first network device, if the target tunnel is a tunnel established between a fourth network device and the network device in the second site, the first network device adds a tunnel identifier of the target tunnel to the second data packet, to obtain a third data packet. The first network device sends the third data packet to the fourth network device, to indicate the fourth network device to parse out the second data packet, determine the flow identifier of the first data flow based on the flow identifier of the second data flow, add the target flow entry to a flow table stored in the fourth network device, and send the second data packet through the target tunnel.

The fourth network device is a network device other than the first network device in the plurality of network devices, and the flow identifier included in the target flow entry currently added by the fourth network device is the flow identifier of the first data flow. The outbound interface identifier in the currently added target flow entry is an identifier of a second interface, and the second interface is an interface that is in the fourth network device and that is configured to receive the third data packet.

It should be noted that, because the tunnel table includes all the tunnels established between the network devices in the first site and the network device in the second site, the target tunnel determined by the first network device may be the tunnel established between the first network device and the network device in the second site, or a tunnel established between another network device other than the first network device in the first site and the network device in the second site, namely, the tunnel established between the fourth network device and the network device in the second site.

In some embodiments, if the target tunnel is the tunnel established between the fourth network device and the network device in the second site, the first network device may add a tunnel index field to the second data packet to obtain the third data packet, where the tunnel index field may include the tunnel identifier of the target tunnel. Then, the first network device may send the third data packet to the fourth network device.

Based on the foregoing descriptions, a network link is established between the first network device and the fourth network device, and the first network device communicates with the fourth network device through the network link. Therefore, after adding the tunnel identifier of the target tunnel to the second data packet to obtain the third data packet, the first network device may send the third data packet to the fourth network device through the network link between the first network device and the fourth network device.

After the fourth network device receives the third data packet, because the tunnel index field includes not only the tunnel identifier of the target tunnel, but also an encapsulation manner, a label, a version number, a protocol type, and the like of the tunnel index field, the fourth network device may parse out the second data packet from the third data packet based on information such as the encapsulation manner, the label, the version number, and the protocol type.

In this application, after parsing out the second data packet, the fourth network device may determine the flow identifier of the second data flow based on the second data packet, and further determine the flow identifier of the first data flow based on the flow identifier of the second data flow.

In an example, the fourth network device may obtain tuple information of the second data packet, and the tuple information includes at least source port information and destination port information. The obtained tuple information is used as the flow identifier of the second data flow. Then, the fourth network device may exchange the source port information and the destination port information in the flow identifier of the second data flow, to obtain the flow identifier of the first data flow.

In another example, the fourth network device may obtain tuple information of the second data packet, and obtain the flow identifier of the second data flow from a stored correspondence between tuple information and a flow identifier based on the tuple information of the second data packet. Then, the flow identifier of the first data flow is obtained from a stored correspondence between the first data flow identifier and the second data flow identifier based on the flow identifier of the second data flow.

It should be noted that, because the fourth network device receives the third data packet through the network link between the fourth network device and the first network device, the outbound interface identifier in the target flow entry currently added by the fourth network device is an interface for communicating with the first network device, namely, a second-type interface.

After adding the target flow entry to the stored flow table, the fourth network device may obtain a target tunnel entry from a stored tunnel table based on the obtained tunnel identifier of the target tunnel, obtain tunnel attribute information of the target tunnel from the target tunnel entry, further perform tunnel encapsulation on the second data packet based on the obtained tunnel attribute information to obtain a fourth data packet, and send the fourth data packet through the target tunnel.

Optionally, the first data packet is a data packet received by the first network device through the tunnel established between the first network device and the network device in the second site. Alternatively, the first data packet is a data packet that is received by the first network device and sent by a fifth network device, and the fifth network device is a network device other than the first network device in the plurality of network devices.

Optionally, a network link is established between the plurality of network devices, and the plurality of network devices communicate through the network link. The network link is a physical link or a network tunnel, and the network tunnel includes a generic routing encapsulation GRE tunnel.

It should be noted that when the plurality of network devices are relatively close to each other, the network link may be a physical link. When the plurality of network devices are relatively far away from each other or cannot be connected through a physical link, the network link may be a network tunnel, and the network tunnel may include a generic routing encapsulation (GRE) tunnel. The network tunnel may alternatively be another tunnel.

In addition, the network link between two network devices in the first site is mainly used to synchronize tunnel entries in the site and transmit data packets in the site, and does not need to be advertised to a network outside the site. Therefore, network addresses on interfaces that are on the network devices in the first site and that are used to establish the network link may all be set to a private network address, and even different sites may use a same address space. This can reduce consumption of network address resources of an operator by an SD-WAN network.

Optionally, when the data packet included in the first data flow is sent to the second site through the tunnel between the first network device and the network device in the second site, after the first network device adds the target flow entry to the flow table stored in the first network device, the first network device may send the target flow entry to another network device in the first site through the network link. After receiving the target flow entry, the another network device may modify an outbound interface of the target flow entry to a second-type interface, namely, an interface through which each another network device communicates with the first network device, and store the modified target flow entry in a flow table. In this way, when receiving the first data packet, the another network device finds the target flow entry in the stored flow table, and may send the first data packet to the first network device through the interface corresponding to the outbound interface identifier included in the target flow entry. Then, the first network device may send the first data packet to the user terminal in the first site based on the target flow entry. It can be learned that synchronizing the target flow entry to another network device in the first site can greatly reduce a case in which the first data packet is continuously traversed and queried between the network devices when the target flow entry is not found, thereby improving efficiency of sending the first data packet.

According to a second aspect, another packet sending method is provided. A plurality of network devices are deployed in a first site. A network link is established between the plurality of network devices. A plurality of tunnels are established between the network devices deployed in the first site and a network device deployed in a second site. The second site is a site that performs data transmission with the first site. The method includes: A first network device receives a first data packet from the second site, where the first data packet is a data packet received by the first network device through a network link between the first network device and a second network device, and the first network device is any one of the plurality of network devices, and the second network device is a network device in the plurality of network devices that establishes the network link to the first network device; and the first network device sends the first data packet to a user terminal in the first site.

In this application, because the network link is established between the plurality of network devices in the first site, a tunnel table of the first network device includes not only a tunnel entry corresponding to a tunnel between the first network device and the network device in the second site, but also a tunnel entry corresponding to a tunnel between another network device in the first site and the network device in the second site. Therefore, when the first network device receives a second data packet from the user terminal in the first site, and a selected target tunnel is a tunnel between a third network device and the network device in the second site, the first network device may send the second data packet to the third network device through a network link between the first network device and the third network device. Then, the third network device sends the second data packet to the second site through the target tunnel. In this way, interworking between the first network device and the third network device is implemented, and communication between the first site and the second site can be implemented without creating excessive tunnels.

According to a third aspect, a packet sending apparatus is provided. The packet sending apparatus has a function of implementing behavior in the packet sending method in the first aspect. The packet sending apparatus includes at least one module, and the at least one module is configured to implement the packet sending method provided in the first aspect.

According to a fourth aspect, another packet sending apparatus is provided. The packet sending apparatus has a function of implementing behavior in the packet sending method in the second aspect. The packet sending apparatus includes at least one module, and the at least one module is configured to implement the packet sending method provided in the second aspect.

According to a fifth aspect, a network device is provided. The network device includes a processor and a memory. The memory is configured to store a program for performing the packet sending method provided in the first aspect or the second aspect, and store data used to implement the packet sending method provided in the first aspect or the second aspect. The processor is configured to execute the program stored in the memory. An operation apparatus of the storage device may further include a communications bus, and the communications bus is configured to establish a connection between the processor and the memory.

According to a sixth aspect, a computer-readable storage medium is provided. The computer-readable storage medium stores instructions. When the instructions are run on a computer, the computer is enabled to perform the packet sending method according to the first aspect or the second aspect.

According to a seventh aspect, a computer program product including instructions is provided. When the computer program product runs on a computer, the computer is enabled to perform the packet sending method according to the first aspect or the second aspect.

Technical effects achieved in the second aspect, the third aspect, the fourth aspect, the fifth aspect, the sixth aspect, and the seventh aspect are similar to technical effects achieved by using corresponding technical means in the first aspect. Details are not described herein again.

The technical solutions provided in this application may bring at least the following beneficial effects:

In this application, when receiving the first data packet from the second site, the first network device may search the flow table for the target flow entry whose flow identifier is the flow identifier of the first data flow. The first data flow is the data flow to which the first data packet belongs. The target flow entry is created when the first site sends the second data flow to the second site. The source address of the second data flow is the destination address of the first data flow, and the destination address of the second data flow is the source address of the first data flow. Therefore, the target flow entry exists in the flow table of the first network device only when the second data flow passes through the first network device. Only in this way, can the first network device find the target flow entry, and then send the first data packet through the interface corresponding to the outbound interface identifier in the target flow entry. It can be learned that, in this application, it can be ensured that the packet sent and the packet received with respect to the same application pass through the same network device.

BRIEF DESCRIPTION OF DRAWINGS

FIG. 5 is a diagram of a tunnel index field according to an embodiment of this application;

FIG. 6 is a flowchart of another packet sending method according to an embodiment of this application;

DESCRIPTION OF EMBODIMENTS

To make the objectives, technical solutions, and advantages of this application clearer, the following further describes the implementations of this application in detail with reference to the accompanying drawings.

Figure 1:
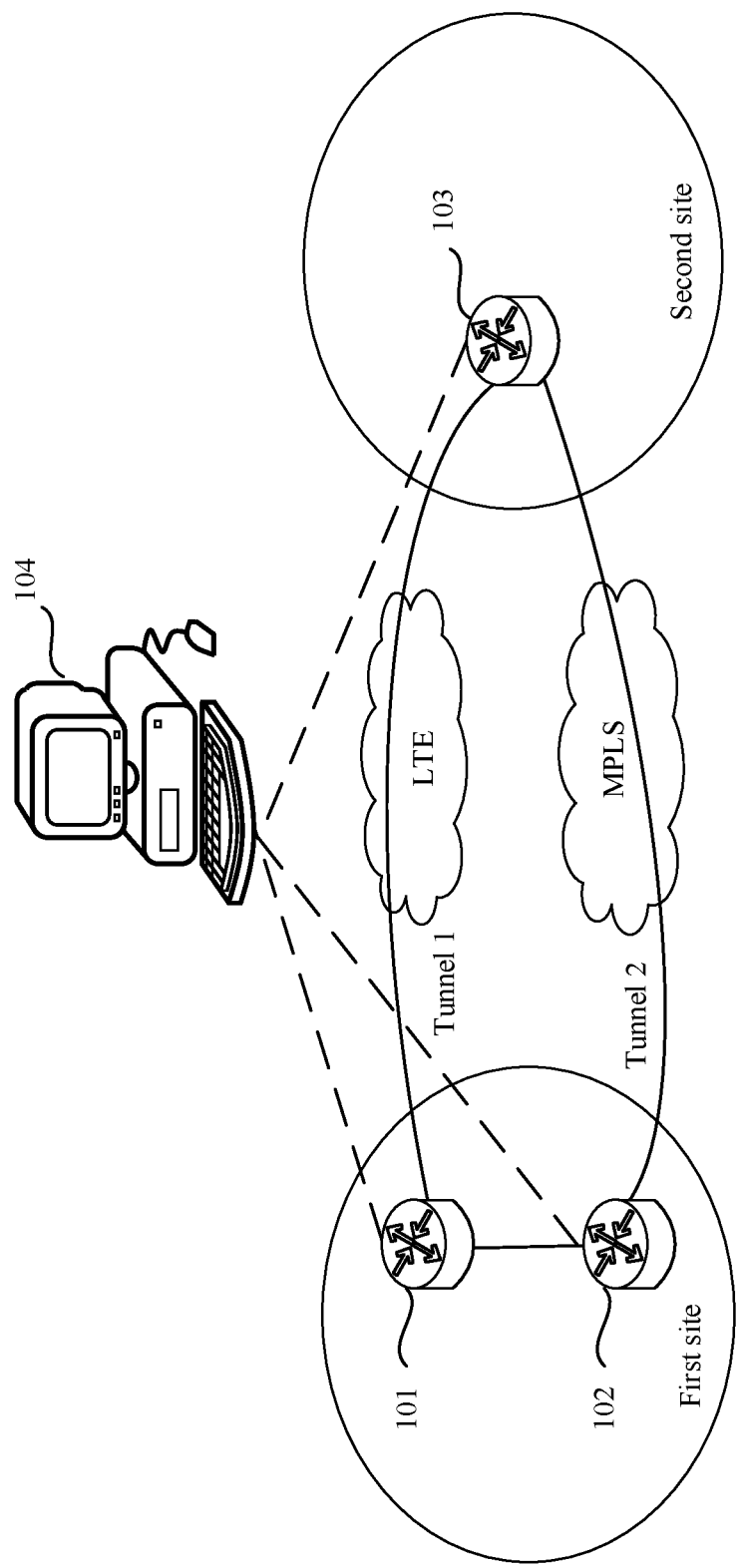
FIG. 1 is a diagram of a system architecture in a packet sending method according to an embodiment of this application.

FIG. 1 is a diagram of a system architecture in a packet sending method according to an embodiment of this application. As shown in FIG. 1, the system includes a network device 101, a network device 102, a network device 103, and a control device 104. The network device 101 and the network device 102 are network devices deployed in a first site, and the network device 103 is a network device deployed in a second site. The network device 101, the network device 102, and the network device 103 may be connected to the control device 104 in a wireless or wired manner to perform communication.

After being powered on, a network device may register with the control device 104. Then, a tunnel may be established between two network devices that belong to different sites through the control device 104. Herein, the network device 101 and the network device 103 are used as examples for description.

As shown in FIG. 1, a first interface of the network device 101 accesses a long term evolution (LTE) network, a first interface of the network device 102 accesses a multi-protocol label switching (MPLS) network, a first interface of the network device 103 accesses the LTE network, and a second interface of the network device 103 accesses the MPLS network. It is assumed that before the network device 101 is powered on, both the network device 102 and the network device 103 complete registration, that is, a tunnel 2 is established between the first interface of the network device 102 and the second interface of the network device 103.

After being powered on, the network device 101 may send a site prefix and a site identifier of the first site and transport network port (TNP) information of the first interface of the network device 101 to the control device 104. Then, the control device 104 determines, based on a stored network topology structure, that the network device 101 can communicate with the network device 103. In this way, the control device 104 may send the site prefix and the site identifier of the first site and the TNP information of the first interface of the network device 101 to the network device 103, and send a site prefix and a site identifier of the second site and TNP information of the first interface of the network device 103 to the network device 101.

After receiving the site prefix and the site identifier of the second site, the network device 101 may add the site prefix and the site identifier of the second site to a stored routing table as a routing entry. Similarly, after receiving the site prefix and the site identifier of the first site, the network device 103 may add the site prefix and the site identifier of the first site to a stored routing table as a routing entry. Next, after the network device 101 receives the TNP information that is of the first interface of the network device 103 and that is sent by the control device 104, and the network device 103 receives the TNP information that is of the first interface of the network device 101 and that is sent by the control device 104, it is assumed that the TNP information of the two interfaces can match. In this case, a tunnel 1 may be established between the first interface of the network device 101 and the first interface of the network device 103. Then, a network link may further be established between a second interface of the network device 101 and a second interface of the network device 102. The network link may be a physical link or a network tunnel, and the network device 101 may communicate with the network device 102 through the network link.

Based on this, after establishing the tunnel 1, the network device 101 may store a tunnel identifier and tunnel attribute information of the tunnel 1 in a tunnel table, and send the tunnel identifier and the tunnel attribute information of the tunnel 1 to the network device 102 through the network link. Then, the network device 101 may receive a tunnel identifier and tunnel attribute information that are of the tunnel 2 and that are sent by the network device 102, and store the tunnel identifier and the tunnel attribute information in the tunnel table. Similarly, tunnel tables of the network device 102 and the network device 103 also store the tunnel identifier and the tunnel attribute information of the tunnel 1, and the tunnel identifier and the attribute information of the tunnel 2.

It should be noted that the TNP information may include parameter information used to establish a tunnel with another network device, for example, a network address and an encryption mode of the interface. In addition, for a same tunnel, source port information and peer port information in tunnel attribute information stored in devices at both ends of the tunnel are opposite. For example, for the tunnel 1, source port information in the tunnel attribute information stored in the network device 101 and the network device 102 is destination port information of the tunnel attribute information stored in the network device 103, and destination port information in the tunnel attribute information stored in the network device 101 and the network device 102 is source port information in the tunnel attribute information stored in the network device 103. The source port information of the tunnel may include a source network address of the tunnel, and the destination port information of the tunnel may include a destination network address of the tunnel.

Next, when receiving a data packet sent by a user terminal in the first site to a user terminal in the second site, the network device 101 may select the tunnel 1 or the tunnel 2 from the tunnel table as a target tunnel, and send the data packet through the target tunnel. When the target tunnel is the tunnel 1, the network device 101 may directly send the data packet through the tunnel 1. When the target tunnel is the tunnel 2, the network device 101 may add the tunnel identifier of the tunnel 2 to the data packet, and then send the data packet added with the tunnel identifier to the network device 102, to indicate the network device 102 to send the data packet through the tunnel 2.

Similarly, when receiving a data packet sent by the user terminal in the first site to the user terminal in the second site, the network device 102 may select the tunnel 1 or the tunnel 2 from the tunnel table as a target tunnel, and send the data packet through the target tunnel according to the foregoing same method. When receiving a data packet sent by the user terminal in the second site to the user terminal in the first site, the network device 103 may select the tunnel 1 or the tunnel 2 from the tunnel table as a target tunnel, and send the data packet through the target tunnel.

Optionally, in the system shown in FIG. 1, an example in which two network devices are deployed in the first site and one network device is deployed in the second site is used for description. In another embodiment, one network device or more than two network devices may alternatively be deployed in the first site, and two or more network devices may alternatively be deployed in the second site. In addition, a quantity of network devices deployed in the first site may be the same as or different from a quantity of network devices deployed in the second site.

Figure 2:
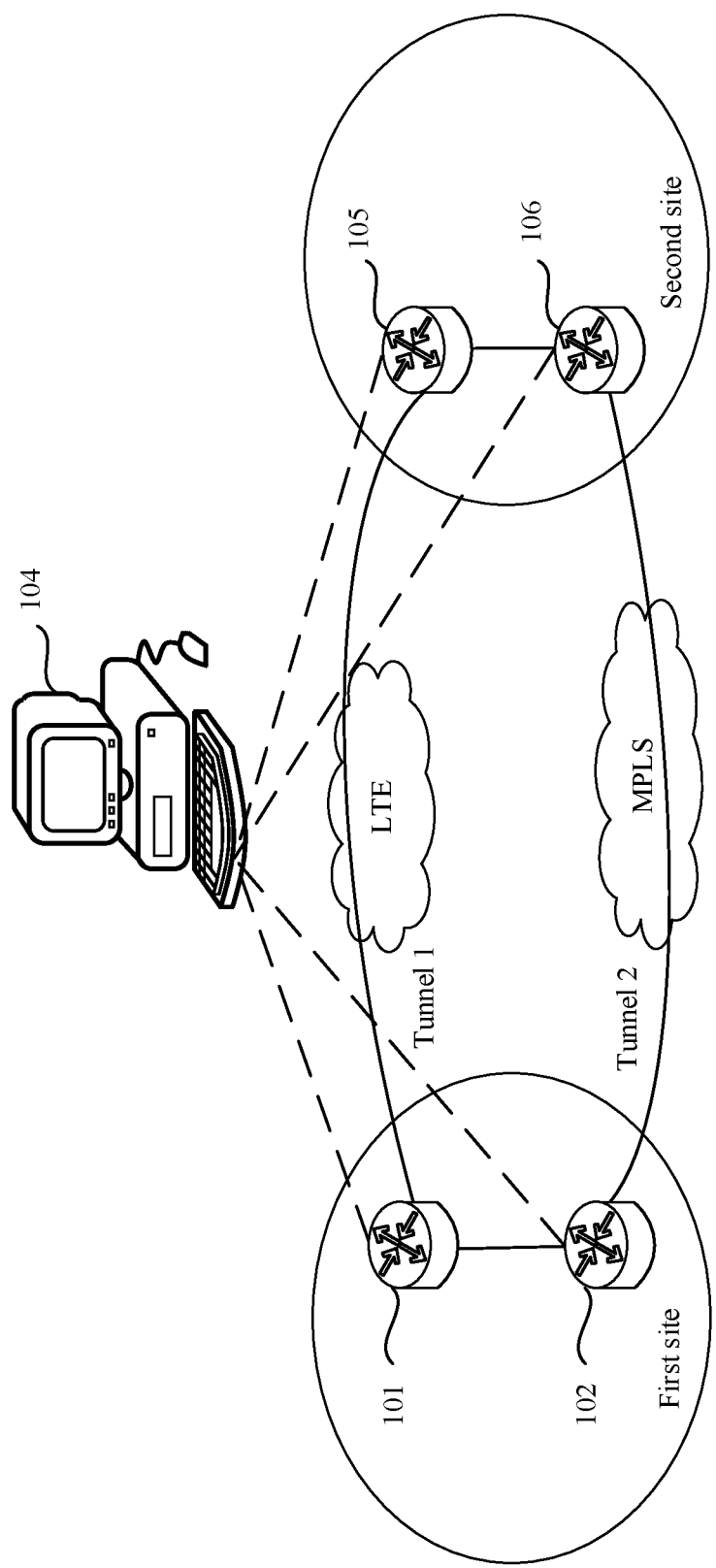
FIG. 2 is a diagram of a system architecture in another packet sending method according to an embodiment of this application.

For example, as shown in FIG. 2, in a system architecture shown in FIG. 2, two network devices are deployed in each of the first site and the second site. The network device 101 and the network device 102 are deployed in the first site, and a network device 105 and a network device 106 are deployed in the second site. According to the foregoing method, a tunnel 1 may be established between the network device 101 and the network device 105, a tunnel 2 may be established between the network device 102 and the network device 106, and a network link is established between the network device 101 and the network device 102.

Figure 3:
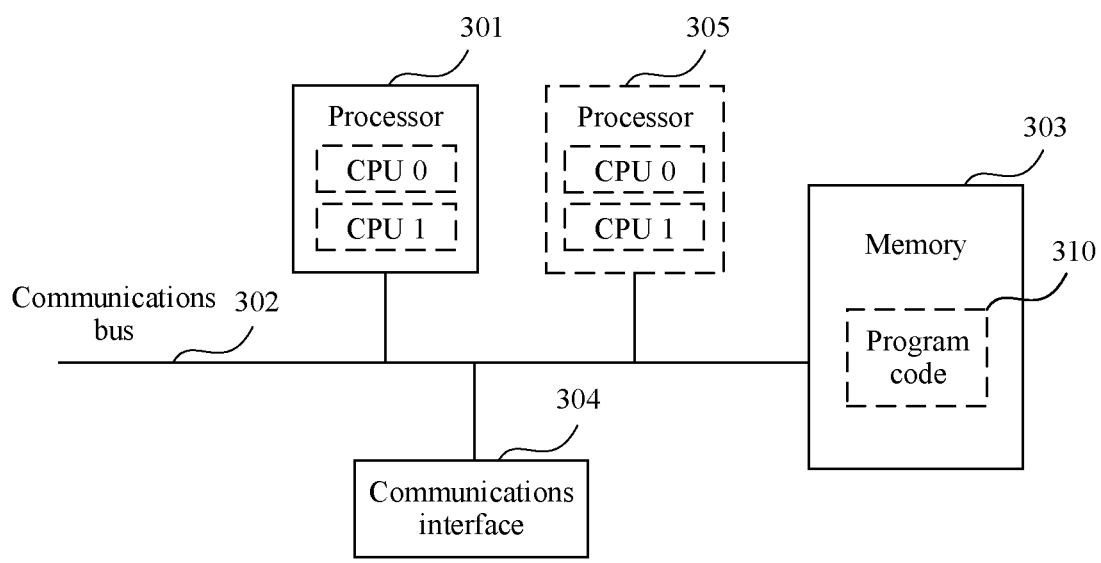
FIG. 3 is a diagram of a network device according to an embodiment of this application.

FIG. 3 is a diagram of a network device according to an embodiment of this application. The network device may be the network device shown in FIG. 1 or FIG. 2. The network device includes at least one processor 301, a communications bus 302, a memory 303, and at least one communications interface 304.

The processor 301 may be a microprocessor (including a central processing unit (CPU) or the like), a network processor (NP), a microprocessor, or one or more integrated circuits configured to implement the solutions of this application, for example, an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The communications bus 302 is configured to transmit information between the foregoing components. The communications bus 302 may be classified as an address bus, a data bus, a control bus, or the like. For ease of representation, only one bold line is used to represent the bus in the figure, but it does not mean that there is only one bus or only one type of bus.

The memory 303 may be a read-only memory (ROM), a random access memory (RAM), an electrically erasable programmable read-only memory (EEPROM), an optical disc (including a compact disc read-only memory (CD-ROM), a compact disc, a laser disc, a digital versatile disc, a Blu-ray disc, or the like), a magnetic disk storage medium or another magnetic storage device, or any other medium that can be configured to carry or store expected program code in a form of an instruction or a data structure and that can be accessed by a network. However, this is not limited hereto. The memory 303 may exist independently, and be connected to the processor 301 through the communications bus 302. Alternatively, the memory 303 may be integrated with the processor 301.

The communications interface 304 is configured to communicate with another device or a communications network by using any apparatus such as a transceiver. The communications interface 304 includes a wired communications interface, and may further include a wireless communications interface. The wired communications interface may be, for example, an Ethernet interface. The Ethernet interface may be an optical interface, an electrical interface, or a combination thereof. The wireless communications interface may be a wireless local area network (WLAN) interface, a cellular network communications interface, a combination thereof, or the like.

In an implementation, in an embodiment, the processor 301 may include one or more CPUs, for example, a CPU 0 and a CPU 1 shown in FIG. 3.

In an implementation, in an embodiment, the network device may include a plurality of processors, for example, the processor 301 and a processor 305 shown in FIG. 3. Each of the processors may be a single-core processor or a multi-core processor. The processor herein may refer to one or more devices, circuits, and/or processing cores configured to process data (for example, network program instructions).

In some embodiments, the memory 303 is configured to store program code 310 for executing the solutions in this application, and the processor 301 may execute the program code 310 stored in the memory 303. The network device may implement, by using the processor 301 and the program code 310 in the memory 303, the packet sending method provided in the following embodiments in FIG. 4, FIG. 6, or FIG. 8.

Figure 4:
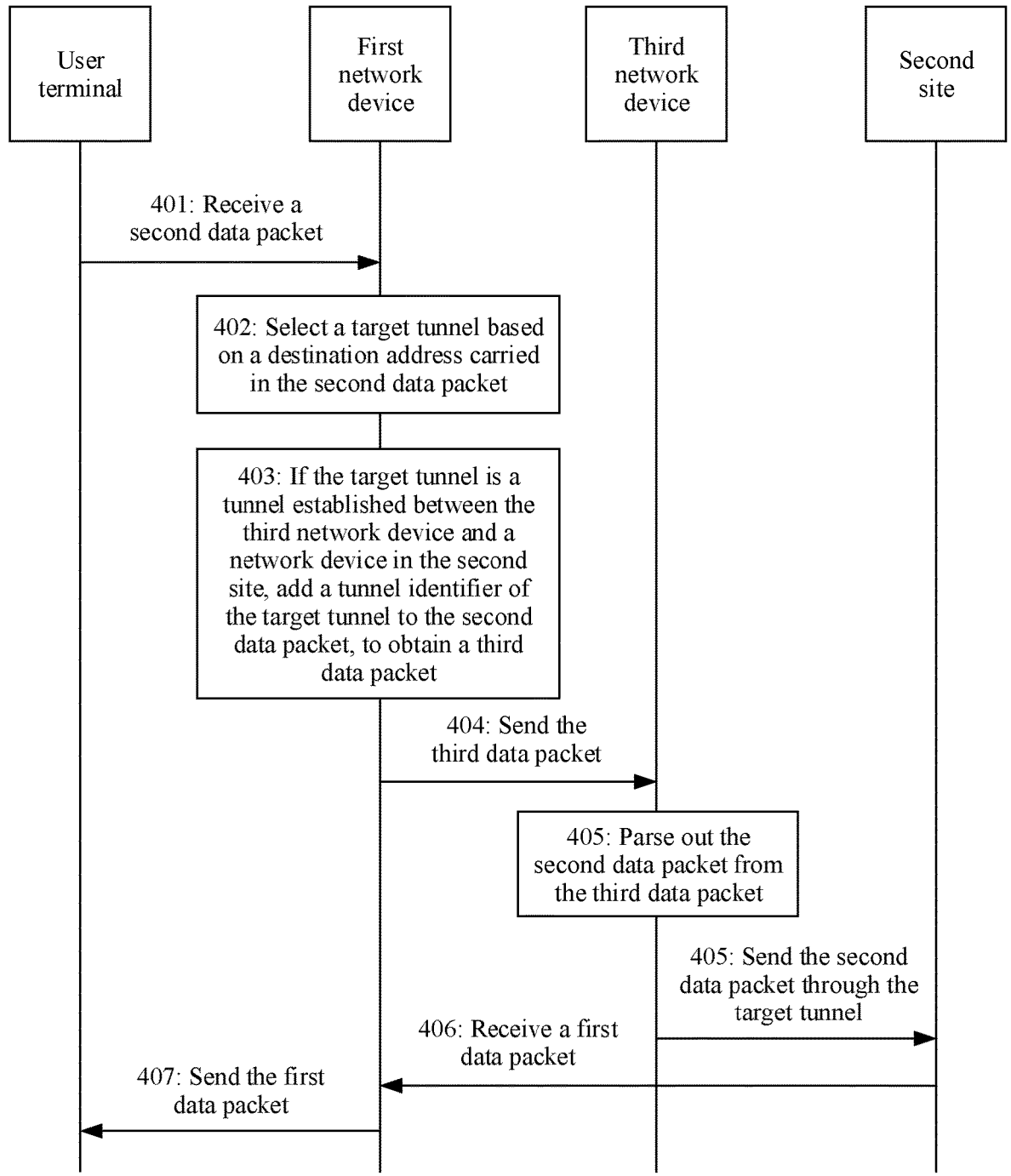
FIG. 4 is a flowchart of a packet sending method according to an embodiment of this application.

FIG. 4 is a flowchart of a packet sending method according to an embodiment of this application. In this embodiment of this application, a plurality of network devices are deployed in a first site, a network link is established between the plurality of network devices, a plurality of tunnels are established between the network devices deployed in the first site and a network device deployed in a second site, and the second site is a site that performs data transmission with the first site. Refer to FIG. 4. The method includes the following steps.

Step 401: A first network device receives a second data packet from a user terminal in the first site, where the second data packet carries a destination address, and the second data packet belongs to a second data flow.

The first network device is any one of the plurality of network devices in the first site. Because the second data packet belongs to the second data flow, and the second data flow is a data flow sent by the user terminal in the first site to a user terminal in the second site, the destination address carried in the second data packet is a destination address of the user terminal in the second site.

It should be noted that, when the user terminal in the first site sends the second data packet to the user terminal in the second site, because the two user terminals belong to different sites, the user terminal in the first site needs to send the second data packet to a network device in the first site, to send the second data packet to the network device in the second site through the network device, and then the network device in the second site sends the second data packet to the user terminal in the second site.

In an example, the user terminal in the first site may select a network device from the plurality of network devices in the first site as the first network device based on a networking manner of the first site, and then send the second data packet to the first network device, to send the second data packet to the network device in the second site through the first network device.

It should be noted that a user terminal may store a correspondence between a networking manner and a device identifier. When the user terminal needs to send a data packet, the user terminal may determine, based on a networking manner of a site in which the user terminal is located and the correspondence between a networking manner and a device identifier, a network device to send the data packet. For example, for the user terminal in the first site, the user terminal may obtain a corresponding device identifier from a stored correspondence between a networking manner and a device identifier based on the networking manner of the first site, and further determine a network device identified by the device identifier as the first network device.

Step 402: The first network device selects, based on the destination address carried in the second data packet, a tunnel from the plurality of tunnels established between the first site and the second site as a target tunnel.

In this embodiment of this application, the first network device stores a routing table, the routing table includes a plurality of routing entries, and each of the plurality of routing entries includes a site prefix and a corresponding site identifier. The site prefix refers to a network segment corresponding to a site, and the site identifier refers to an identifier of the site, and is used to uniquely identify the site.

The following uses steps (1) to (3) to describe an implementation process in which the first network device determines the target tunnel.

(1) The first network device determines a target routing entry from the routing table based on the destination address carried in the second data packet, where the destination address matches a site prefix included in the target routing entry.

Because the site prefix refers to a network segment corresponding to a site, the destination address carried in the second data packet may be matched with the site prefix included in each routing entry in the routing table, to determine the target routing entry from the routing table.

It should be noted that, based on the foregoing descriptions, the destination address carried in the second data packet is the address of the user terminal in the second site.

Therefore, it may be determined that the site prefix included in the target routing entry is a site prefix of the second site, and a site identifier included in the target routing entry is an identifier of the second site.

(2) The first network device determines one or more tunnel entries based on the site identifier included in the target routing entry, where the one or more tunnel entries are tunnel entries corresponding to the tunnels established between the first site and the second site.

The first network device may store one tunnel table, and the tunnel table is used to store tunnel entries corresponding to a plurality of sites. The first network device may alternatively store a plurality of tunnel tables, and the plurality of tunnel tables are in a one-to-one correspondence with the plurality of sites. The plurality of sites refer to sites that establish tunnels with the first site, and the plurality of sites include the second site. For the two cases, manners of determining the one or more tunnel entries by the first network device are different. Therefore, the following provides descriptions for the two cases.

In the first case, the first network device stores one tunnel table. In this case, the first network device may determine one or more tunnel identifiers based on the site identifier included in the target routing entry, where the one or more tunnel identifiers are identifiers of the tunnels established between the first site and the second site. Then, the first network device may determine the one or more tunnel entries from the tunnel table based on the one or more tunnel identifiers.

It should be noted that regardless of how many tunnel tables are stored in the first network device, each tunnel table may include a plurality of tunnel entries, and each of the plurality of tunnel entries may include a tunnel identifier and corresponding tunnel attribute information. The tunnel attribute information may include a tunnel encapsulation manner, a source address and a destination address of a tunnel, whether the tunnel is available, bandwidth of the tunnel, a delay of the tunnel, and the like. In addition, in some embodiments, the first network device may store a first mapping relationship between a site identifier and a tunnel identifier. The first mapping relationship stores an identifier of each site that establishes the tunnel with the first site, and an identifier of the tunnel established between each site and the first site. In this way, the first network device may determine the one or more tunnel identifiers from the first mapping relationship based on the site identifier included in the target routing entry. Then, the first network device may determine, from the tunnel table, tunnel entries whose included tunnel identifiers are the same as the one or more tunnel identifiers, to obtain the one or more tunnel entries.

In the second case, the first network device stores a plurality of tunnel tables. In this case, the first network device may determine an identifier of a target tunnel table based on the site identifier included in the target routing entry. The target tunnel table is a tunnel table in the plurality of tunnel tables that corresponds to the second site. Then, the first network device may determine the target tunnel table from the plurality of tunnel tables based on the identifier of the target tunnel table, and determine tunnel entries stored in the target tunnel table as the one or more tunnel entries.

The first network device stores different tunnel tables for different sites, and the first network device may store a second mapping relationship between a site identifier and a tunnel table identifier. The second mapping relationship stores an identifier of each site that establishes the tunnel with the first site, and an identifier of the tunnel table corresponding to each site. In this way, the first network device may determine the identifier of the target tunnel table from the second mapping relationship based on the site identifier included in the target routing entry. Then, the target tunnel table may be determined from the plurality of tunnel tables based on the identifier of the target tunnel table, and the tunnel entries in the target tunnel table are further determined as the one or more tunnel entries.

(3) The first network device selects a tunnel entry from the one or more tunnel entries as a target tunnel entry, and determines a tunnel corresponding to the target tunnel entry as the target tunnel.

The first network device may select a tunnel entry from the one or more tunnel entries as the target tunnel entry according to a tunnel selection policy, and further determine a tunnel corresponding to the target tunnel entry as the target tunnel, that is, use a tunnel identified by a tunnel identifier included in the target tunnel entry as the target tunnel.

For example, the tunnel selection policy stored by the first network device is selecting a tunnel with a maximum bandwidth. In this way, the first network device may obtain tunnel attribute information included in the one or more tunnel entries, and obtain bandwidths of the tunnels from the tunnel attribute information. Then, the first network device may select, from the one or more tunnel entries, a tunnel entry with a maximum bandwidth based on the bandwidths of the tunnels.

Optionally, each tunnel entry further includes a connection identifier, and the connection identifier is used to indicate whether a corresponding tunnel is connected, that is, whether the corresponding tunnel is available. Therefore, before selecting the target tunnel entry according to the tunnel selection policy, the first network device may alternatively filter, from the one or more tunnel entries, tunnel entries whose connection identifiers are valid, to further select the target tunnel entry from the filtered tunnel entries according to the tunnel selection policy.

Step 403: If the target tunnel is a tunnel established between a third network device and the network device in the second site, the first network device adds a tunnel identifier of the target tunnel to the second data packet, to obtain a third data packet, where the third network device is a network device other than the first network device in the plurality of network devices in the first site.

It should be noted that, because the tunnel table includes all the tunnels established between the network devices in the first site and the network device in the second site, the target tunnel determined by the first network device may be the tunnel established between the first network device and the network device in the second site or the tunnel established between the third network device and the network device in the second site, where the third network device is a network device other than the first network device in the first site.

In some embodiments, if the target tunnel is the tunnel established between the third network device and the network device in the second site, the first network device may add a tunnel index field to the second data packet to obtain the third data packet.

For example, as shown in FIG. 5, the tunnel index field may include a tunnel identifier, and the tunnel identifier may be the tunnel identifier of the target tunnel. Optionally, the tunnel index field may further include an encapsulation manner, a label, a version number, a protocol type, and the like. The encapsulation manner is a tunnel type corresponding to the tunnel identifier. The label is a flag bit, and may be used to indicate that a data packet is sent from a user side to a tunnel side or received from the tunnel side. The version number is a version number of the used tunnel index field. The protocol type is a protocol type of the second data packet.

Step 404: The first network device sends the third data packet to the third network device through a network link between the first network device and the third network device.

Based on the foregoing descriptions, the network link is established between the first network device and the third network device, and the first network device communicates with the third network device through the network link. Therefore, after adding the tunnel identifier of the target tunnel to the second data packet to obtain the third data packet, the first network device may send the third data packet to the third network device through the network link between the first network device and the third network device.

It should be noted that when the first network device is relatively close to the third network device, the network link may be a physical link. When the first network device is relatively far away from the third network device or cannot be connected to the third network device through a physical link, the network link may be a network tunnel, and the network tunnel may include a generic routing encapsulation (GRE) tunnel. The network tunnel may alternatively be another tunnel.

In addition, the network link between two network devices in the first site is mainly used to synchronize tunnel entries in the site and transmit data packets in the site, and does not need to be advertised to a network outside the site. Therefore, network addresses on interfaces that are on the network devices in the first site and that are used to establish the network link may all be set to a private network address, and even different sites may use a same address space. This can reduce consumption of network address resources of an operator by an SD-WAN network.

Step 405: The third network device receives the third data packet, parses out the second data packet from the third data packet, and sends the second data packet through the target tunnel.

In some embodiments, because the tunnel index field includes not only the tunnel identifier of the target tunnel, but also the encapsulation manner, the label, the version number, the protocol type, and the like of the tunnel index field, the second data packet may be parsed out from the third data packet based on information such as the encapsulation manner, the label, the version number, and the protocol type. In addition, the tunnel identifier of the target tunnel may further be obtained.

Because the third network device also stores the target tunnel entry, the third network device may obtain tunnel attribute information of the target tunnel from the target tunnel entry based on the tunnel identifier of the target tunnel, further perform tunnel encapsulation on the second data packet based on the obtained tunnel attribute information to obtain a fourth data packet, and send the fourth data packet through the target tunnel.

The foregoing steps 403 to 405 are for a case in which the target tunnel is the tunnel between the third network device and the network device in the second site. When the target tunnel is a tunnel between the first network device and the network device in the second site, the first network device may directly send the second data packet through the target tunnel.

In this case, an implementation process in which the first network device sends the second data packet through the target tunnel may include: The first network device may obtain tunnel attribute information of the target tunnel from the target tunnel entry, further perform tunnel encapsulation on the second data packet based on the obtained tunnel attribute information to obtain a fourth data packet, and send the fourth data packet through the target tunnel.

It should be noted that, after receiving the fourth data packet, the network device in the second site may perform tunnel decapsulation on the fourth data packet, to obtain the second data packet.

It should be noted that the foregoing steps 401 to 405 are a case in which the user terminal in the first site sends a data packet to the user terminal in the second site. It should be understood that the user terminal in the second site may alternatively send a data packet to the user terminal in the first site. Therefore, the following describes, by using steps 406 and 407, a case in which the user terminal in the second site sends a data packet to the user terminal in the first site.

Step 406: The first network device receives a first data packet from the second site, where the first data packet belongs to a first data flow.

The first data flow is a data flow sent by the user terminal in the second site to the user terminal in the first site. Therefore, a source address of the first data flow is a destination address of the second data flow, and a destination address of the first data flow is a source address of the second data flow.

It should be noted that an implementation process in which the network device in the second site receives the first data packet from the user terminal in the second site, and sends the first data packet to the network device in the first site is similar to the manner in steps 401 to 405, and details are not described herein again.

Step 407: The first network device sends the first data packet to the user terminal in the first site.

In some embodiments, each network device in the first site may communicate with the user terminal in the first site. Therefore, after receiving the first data packet from the second site, the first network device may directly send the first data packet to the user terminal in the first site.

In other words, the first network device sends the first data packet to the user terminal in the first site in the manner in steps 406 and 407.

In some other embodiments, the plurality of network devices in the first site may form a VRRP group according to a virtual router redundancy protocol (VRRP). The VRRP group includes a primary network device and one or more secondary network devices. The primary network device is configured to interact with the user terminal in the first site, and the secondary network device may take over the primary network device when the primary network device is faulty. In this case, when the first network device is the primary network device, after receiving the first data packet, the first network device may send the first data packet to the user terminal in the first site. The first data packet may be a data packet received by the first network device through a network link between the first network device and a second network device, and the second network device is a network device, in the plurality of network devices in the first site, that establishes the network link to the first network device. The first data packet may alternatively be a data packet received by the first network device through the tunnel established between the first network device and the network device in the second site.

It should be noted that after receiving the first data packet, the network device in the second site may select a tunnel from the tunnels between the second site and the first site, and send the first data packet to the first site through the selected tunnel. When the selected tunnel is the tunnel established between the network device in the second site and the first network device, the first network device may directly receive the first data packet through the tunnel. Because the first network device is the primary network device, the first network device may directly send the first data packet to the user terminal in the first site. When the selected tunnel is a tunnel established between the network device in the second site and the second network device, the second network device may receive the first data packet through the tunnel. Because the first network device is the primary network device, the second network device further needs to send the first data packet to the first network device through the network link. In other words, the first network device may receive, through the network link, the first data packet sent by the second network device. Then, the first network device may send the first data packet to the user terminal in the first site.

It should be noted that the first network device stores a local route, and the local route stores routing information between the first network device and the user terminal in the first site.

Therefore, after receiving the first data packet, the first network device may send the first data packet to the user terminal in the first site based on the local route.

In addition, the second network device and the third network device may be a same network device. The second network device and the third network device may alternatively be different network devices.

In this embodiment of this application, because the network link is established between the plurality of network devices in the first site, the tunnel table of the first network device includes not only a tunnel entry corresponding to the tunnel between the first network device and the network device in the second site, but also a tunnel entry corresponding to a tunnel between another network device in the first site and the network device in the second site. Therefore, when the first network device receives the second data packet from the user terminal in the first site, and the selected target tunnel is the tunnel between the third network device and the network device in the second site, the first network device may send the second data packet to the third network device through the network link between the first network device and the third network device. Then, the third network device sends the second data packet to the second site through the target tunnel. In this way, interworking between the first network device and the third network device is implemented, and communication between the first site and the second site can be implemented without creating excessive tunnels.

FIG. 6 is a flowchart of a packet sending method according to an embodiment of this application. In this embodiment of this application, a plurality of network devices are deployed in a first site, a plurality of tunnels are established between the network devices deployed in the first site and a network device deployed in a second site, and the second site is a site that performs data transmission with the first site. Refer to FIG. 6. The method includes the following steps.

Step 601: A first network device receives a second data packet from a user terminal in the first site, where the second data packet carries a destination address, and the second data packet belongs to a second data flow.

In this embodiment of this application, for a related explanation in step 601, refer to the related explanation in step 401 in the foregoing embodiment. Details are not described herein again.

Step 602: The first network device selects, based on the destination address carried in the second data packet, a tunnel from the plurality of tunnels established between the first site and the second site as a target tunnel.

In this embodiment of this application, for a related explanation in step 602, refer to the related explanation in step 402 in the foregoing embodiment. Details are not described herein again.

Step 603: The first network device determines a flow identifier of a first data flow based on a flow identifier of the second data flow.

The first data flow is a data flow sent by a user terminal in the second site to the user terminal in the first site, and the second data flow is a data flow sent by the user terminal in the first site to the user terminal in the second site. Therefore, a source address of the first data flow is a destination address of the second data flow, and a destination address of the first data flow is a source address of the second data flow.

In some embodiments, the first network device may determine the flow identifier of the second data flow based on the second data packet, and further determine the flow identifier of the first data flow based on the flow identifier of the second data flow.

In an example, the first network device may obtain tuple information of the second data packet, and the tuple information includes at least source port information and destination port information. The obtained tuple information is used as the flow identifier of the second data flow. Then, the first network device may exchange the source port information and the destination port information in the flow identifier of the second data flow, to obtain the flow identifier of the first data flow.

It should be noted that, in this example, 5-tuple information of the second data packet may be determined as the flow identifier of the second data flow, or 3-tuple information of the second data packet may be determined as the flow identifier of the second data flow, or 7-tuple information of the second data packet is determined as the flow identifier of the second data flow. This is not limited in this embodiment of this application. The second data flow can be uniquely identified provided that the flow identifier of the second data flow includes at least the source port information and the destination port information.

For example, the flow identifier of the second data flow is 5-tuple information, the source address is 192.168.0.1, the destination address is 192.168.1.1, a source port is a port 1, a destination port is a port 2, and a protocol number is a protocol number 1. Then, the first network device may exchange the source address and the destination address in the flow identifier of the second data flow, and exchange the source port and the destination port in the flow identifier of the second data flow, to obtain new 5-tuple information, where a source address is 192.168.1.1, a destination address is 192.168.0.1, a source port is the port 2, a destination port is the port 1, a protocol number is the protocol number 1. The new 5-tuple information is used as the flow identifier of the first data flow.

In another example, the first network device may obtain tuple information of the second data packet, and obtain the flow identifier of the second data flow from a stored correspondence between tuple information and a flow identifier based on the tuple information of the second data packet. Then, the flow identifier of the first data flow is obtained from a stored correspondence between the first data flow identifier and the second data flow identifier based on the flow identifier of the second data flow.

For example, 5-tuple information of the second data packet is that the source address is 192.168.0.1, the destination address is 192.168.1.1, a source port is a port 1, a destination port is a port 2, and a protocol number is a protocol number 1. Then, based on the 5-tuple information of the second data packet, the first network device may learn, from the correspondence between the tuple information and the flow identifier shown in the following Table 1, that the flow identifier of the second data flow is an ID 2. Then, based on the flow identifier of the second data flow, the first network device obtains, from the correspondence between the first data flow identifier and the second data flow identifier shown in the following Table 2, that the flow identifier of the first data flow is an ID 1.

TABLE 1

| Tuple information | Flow identifier |
|---|---|
| Source address: 192.168.0.1<br>Destination address: 192.168.1.1<br>Source port: port 1<br>Destination port: port 2<br>Protocol number: protocol number 1 | ID 2 |
| Source address: 192.168.3.1<br>Destination address: 192.168.5.1<br>Source port: port 3<br>Destination port: port 4<br>Protocol number: protocol number 1 | ID 4 |
| Source address: 192.168.6.1<br>Destination address: 192.168.3.1<br>Source port: port 2<br>Destination port: port 3<br>Protocol number: protocol number 2 | ID 6 |

TABLE 2

| Second data flow identifier | First data flow identifier |
|---|---|
| ID 2 | ID 1 |
| ID 4 | ID 3 |
| ID 6 | ID 5 |

Step 604: The first network device adds a target flow entry to a flow table stored in the first network device.

The flow table may include a plurality of flow entries, and each of the plurality of flow entries includes a flow identifier and a corresponding outbound interface identifier. Therefore, the currently added target flow entry includes a flow identifier and a corresponding outbound interface identifier. In addition, the flow identifier in the currently added target flow entry is the flow identifier of the first data flow, the outbound interface identifier in the currently added target flow entry is an identifier of a first interface, and the first interface is an interface that is in the first network device and that is configured to receive the second data packet from the user terminal in the first site.

It should be noted that, when a same data flow flows into the first network device, the data flow may flow into the first network device through an interface for communicating with the user terminal in the first site, or may flow into the first network device through an interface for communicating with another network device in the first site. Therefore, the outbound interface identifier in the target flow entry currently added by the first network device may be an interface that is in the first network device and that communicates with the user terminal in the first site, or may be an interface that is in the first network device and that communicates with another network device in the first site.

Step 605: If the target tunnel is a tunnel established between the first network device and the network device in the second site, the first network device sends the second data packet through the target tunnel.

In this case, the first network device may directly send the second data packet through the target tunnel. An implementation process in which the first network device sends the second data packet through the target tunnel may include: The first network device may obtain tunnel attribute information of the target tunnel from a target tunnel entry, further perform tunnel encapsulation on the second data packet based on the obtained tunnel attribute information to obtain a fourth data packet, and send the fourth data packet through the target tunnel.

Step 605 is for a case in which the target tunnel is the tunnel established between the first network device and the network device in the second site. When the target tunnel is a tunnel between a fourth network device and the network device in the second site, the first network device may add a tunnel identifier of the target tunnel to the second data packet to obtain a third data packet, where the fourth network device is a network device other than the first network device in the plurality of network devices in the first site. The first network device sends the third data packet to the fourth network device. The fourth network device receives the third data packet, and parses out the second data packet from the third data packet. The fourth network device determines the flow identifier of the first data flow based on the flow identifier of the second data flow, adds the target flow entry to a flow table stored in the fourth network device, and sends the second data packet through the target tunnel. The flow identifier included in the target flow entry currently added by the fourth network device is the flow identifier of the first data flow. The outbound interface identifier in the currently added target flow entry is an identifier of a second interface, and the second interface is an interface that is in the fourth network device and that is configured to receive the third data packet.

For an implementation in which the first network device obtains the third data packet and sends the third data packet to the fourth network device, and the fourth network device receives the third data packet and parses out the second data packet, refer to the implementation in steps 403 to 405 in the foregoing embodiment. Details are not described herein again.

In this embodiment of this application, for an implementation in which the fourth network device determines the flow identifier of the first data flow and adds the target flow entry to the stored flow table, refer to the implementation in the foregoing steps 603 and 604. Details are not described herein again.

It should be noted that, because the fourth network device receives the third data packet through a network link between the fourth network device and the first network device, the outbound interface identifier in the target flow entry currently added by the fourth network device is an interface for communicating with the first network device, namely, a second-type interface.

It should be noted that the foregoing steps 601 to 605 are a case in which the user terminal in the first site sends a data packet to the user terminal in the second site. It should be understood that the user terminal in the second site may alternatively send a data packet to the user terminal in the first site. Therefore, the following describes, by using steps 606 to 608, a case in which the user terminal in the second site sends a data packet to the user terminal in the first site.

Step 606: The first network device receives a first data packet from the second site, where the first data packet belongs to a first data flow.

In this embodiment of this application, the first data packet is a data packet received by the first network device through the tunnel established between the first network device and the network device in the second site. Alternatively, the first data packet is a data packet that is received by the first network device and sent by a fifth network device, and the fifth network device is a network device other than the first network device in the plurality of network devices.

To ensure that a data packet sent and a data packet received with respect to a same application pass through a same network device, after a network device in the first site receives the first data packet through a tunnel between the network device and the second site, the network device needs to search for a target flow entry whose flow identifier is the flow identifier of the first data flow. If the target flow entry does not exist in the network device, it may be indicated that the second data flow does not pass through the network device. In this case, the network device needs to send the first data packet to another network device in the first site, so as to find a network device that the second data flow passes through. Therefore, the first data packet may alternatively be a data packet that is received by the first network device and sent by the fifth network device.

It should be noted that the fifth network device and the fourth network device may be a same network device, or the fifth network device may be a network device different from the fourth network device.

Step 607: The first network device searches the flow table stored in the first network device for the target flow entry whose flow identifier is the flow identifier of the first data flow.

Based on the foregoing descriptions, the flow table includes a plurality of flow entries, each of the plurality of flow entries includes a flow identifier and a corresponding outbound interface identifier, and the first data flow is a data flow to which the first data packet belongs. Therefore, the first network device may compare the flow identifier of the first data flow with the flow identifier included in each flow entry in the flow table, to search for the target flow entry whose flow identifier is the flow identifier of the first data flow.

Step 608: If the target flow entry is found, the first network device sends the first data packet through an interface corresponding to an outbound interface identifier in the target flow entry.

In some embodiments, when finding the target flow entry, the first network device may obtain the outbound interface identifier included in the target flow entry, and further send the first data packet based on the interface corresponding to the outbound interface identifier. The interface corresponding to the outbound interface identifier included in the target flow entry may be an interface for communicating with the user terminal in the first site, or may be an interface for communicating with another network device in the first site. Therefore, the following separately describes methods for sending the first data packet in the two cases.

In an embodiment, if the interface corresponding to the outbound interface identifier in the target flow entry is a first-type interface, the first network device sends the first data packet to the user terminal in the first site through the interface corresponding to the outbound interface identifier in the target flow entry, where the first-type interface is an interface for communicating with the user terminal in the first site.

In another embodiment, if the interface corresponding to the outbound interface identifier in the target flow entry is a second-type interface, the first network device sends the first data packet to a third network device through the interface corresponding to the outbound interface identifier in the target flow entry, to indicate the third network device to search a flow table stored in the third network device for the target flow entry. The second-type interface is an interface for communicating with another network device in the plurality of network devices in the first site, and the third network device is a device, in the plurality of network devices in the first site, that communicates with the first network device through the interface corresponding to the outbound interface identifier in the target flow entry.

It should be noted that the third network device and the fifth network device may be different network devices, but the third network device and the fourth network device may be a same network device, or the third network device may be a network device different from the fourth network device.

In some other embodiments, when the first network device does not find the target flow entry, the first network device may determine whether a network device that does not search for the target flow entry still exists in the plurality of network devices in the first site. If the network device that does not search for the target flow entry still exists in the plurality of network devices in the first site, the first network device sends the first data packet to a second network device, to indicate the second network device to search a flow table stored in the second network device for the target flow entry. The second network device is a network device that does not search for the target flow entry in the plurality of network devices in the first site. If the plurality of network devices in the first site all search for the target flow entry, the first network device sends the first data packet through a local route.

In an example, every two of the plurality of network devices in the first site may be connected through a network link, that is, every two network devices may communicate with each other. In this case, the first data packet may carry a device identifier of each network device through which the first data packet passes. In this way, when determining whether the network device that does not search for the target flow entry still exists in the first site, the first network device may determine, based on the device identifier of the network device carried in the first data packet, the network device that does not search for the target flow entry in the plurality of network devices in the first site.

Optionally, in this case, a device identifier field may be added to the first data packet, and the device identifier field may include the device identifier of each network device through which the first data packet passes. In this way, when determining whether the network device that does not search for the target flow entry still exists in the first site, the first network device may determine, based on the device identifier included in the device identifier field in the first data packet, the network device that does not search for the target flow entry in the plurality of network devices in the first site.

Figure 7:
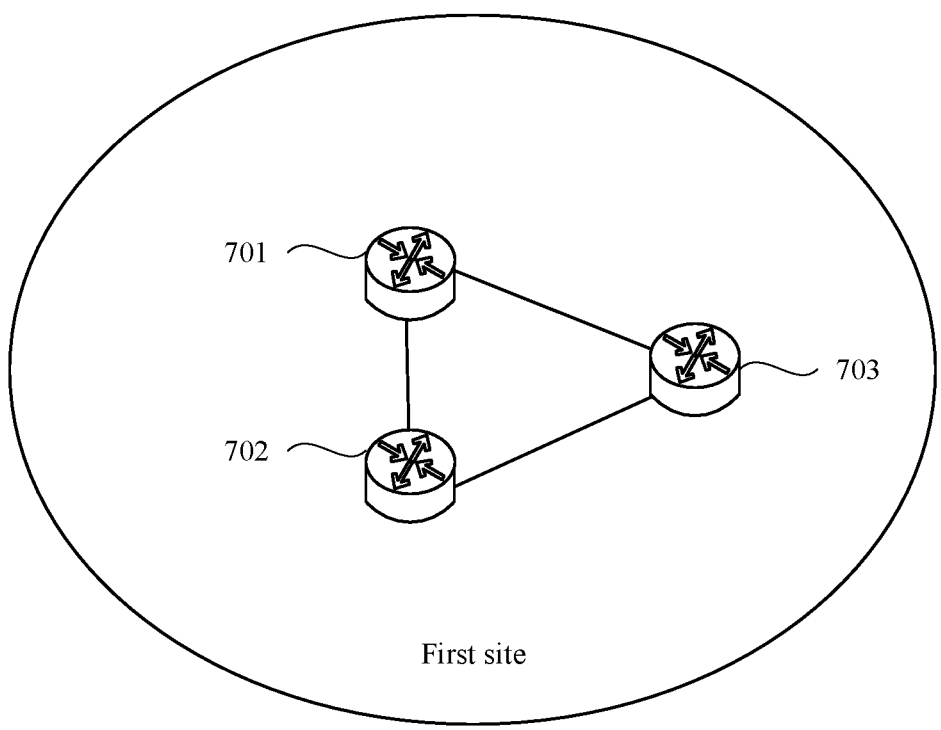
FIG. 7 is a diagram of deploying a network device in a first site according to an embodiment of this application.

For example, as shown in FIG. 7, three network devices are deployed in the first site, which are respectively a network device 701, a network device 702, and a network device 703. In addition, there is a network link between the network device 701 and the network device 702, a network link between the network device 702 and the network device 703, and a network link between the network device 701 and the network device 703. After the network device 701 receives the first data packet, if the target flow entry is not found in a flow table, the network device 701 may obtain the device identifier field carried in the first data packet, and determine, based on the device identifier of the network device included in the device identifier field, the network device that is in the first site and that does not search for the target flow entry. It is assumed that neither the network device 702 nor the network device 703 searches for the target flow entry. In this case, the network device 701 may add a device identifier of the network device 701 to the device identifier field carried in the first data packet, and send the first data packet to the network device 702 or the network device 703 through the network link. Herein, sending to the network device 702 is used as an example. After the network device 702 receives the first data packet, if the target flow entry is not found in a flow table, the network device 702 may obtain the device identifier field carried in the first data packet, and determine, based on the device identifier of the network device included in the device identifier field, that the network device that is in the first site and that does not search for the target flow entry is the network device 703. Then, the network device 702 may add a device identifier of the network device 702 to the device identifier field carried in the first data packet, and further send the first data packet to the network device 703.

It should be noted that each network device in the first site stores a local route, and the local route stores routing information between the corresponding network device and the user terminal in the first site. Therefore, after the first network device receives the first data packet, and the plurality of network devices in the first site all search for the target flow entry, the first network device may send the first data packet to the user terminal in the first site based on the local route.

In addition, the second network device and the fifth network device may be different network devices, but the second network device, the third network device, and the fourth network device may be a same network device, or the second network device may be a network device different from the third network device and the fourth network device.

Optionally, when the data packet included in the first data flow is sent to the second site through the tunnel between the first network device and the network device in the second site, after the first network device adds the target flow entry to the flow table stored in the first network device, the first network device may send the target flow entry to another network device in the first site through the network link. After receiving the target flow entry, the another network device may modify an outbound interface of the target flow entry to a second-type interface, namely, an interface through which each another network device communicates with the first network device, and store the modified target flow entry in a flow table. In this way, when receiving the first data packet, the another network device finds the target flow entry in the stored flow table, and may send the first data packet to the first network device through the interface corresponding to the outbound interface identifier included in the target flow entry. Then, the first network device may send the first data packet to the user terminal in the first site based on the target flow entry. It can be learned that synchronizing the target flow entry to another network device in the first site can greatly reduce a case in which the first data packet is continuously traversed and queried between the network devices when the target flow entry is not found, thereby improving efficiency of sending the first data packet.

In this embodiment of this application, when receiving the first data packet from the second site, the first network device may search the flow table for the target flow entry whose flow identifier is the flow identifier of the first data flow. The first data flow is the data flow to which the first data packet belongs. The target flow entry is created when the first site sends the second data flow to the second site. The source address of the second data flow is the destination address of the first data flow, and the destination address of the second data flow is the source address of the first data flow. Therefore, the target flow entry exists in the flow table of the first network device only when the second data flow passes through the first network device. Only in this way, can the first network device find the target flow entry, and then send the first data packet through the interface corresponding to the outbound interface identifier in the target flow entry. It can be learned that, in this embodiment of this application, it can be ensured that the packet sent and the packet received with respect to the same application pass through the same network device.

Figure 8:
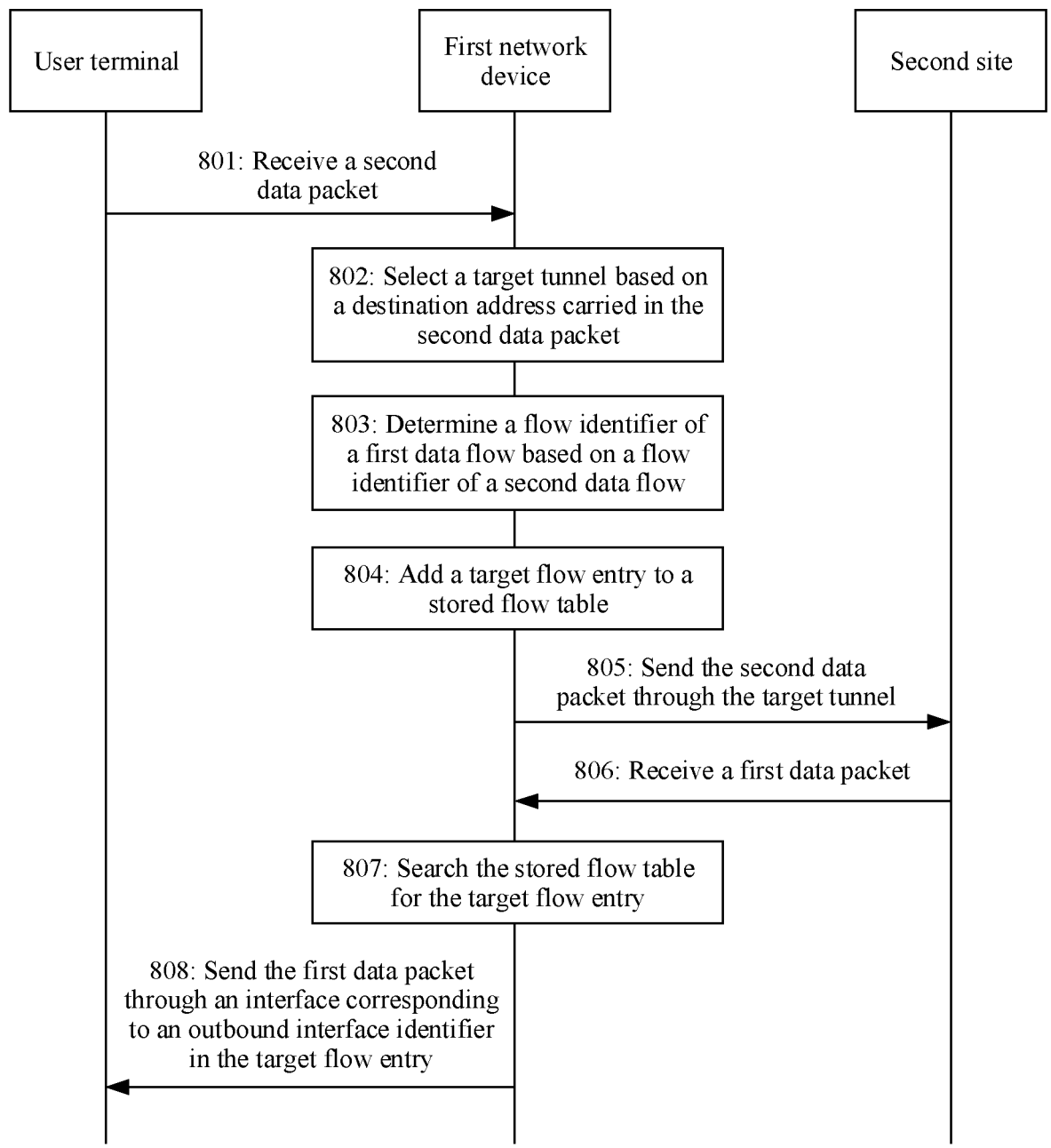
FIG. 8 is a flowchart of another packet sending method according to an embodiment of this application.

In the foregoing embodiments, the packet sending method provided in the embodiments of this application is described by using an example in which a plurality of network devices are deployed in the first site. The following describes the packet sending method provided in the embodiments of this application by using an example in which the first network device and the second network device are deployed in the first site. FIG. 8 is a flowchart of a packet sending method according to an embodiment of this application. In this embodiment of this application, a first network device and a second network device each establish a tunnel to a third network device, and a second site is a site that performs data transmission with the first site. The method includes the following steps.

Step 801: The first network device receives a second data packet from a user terminal in the first site, where the second data packet carries a destination address, and the second data packet belongs to a second data flow.

In this embodiment of this application, for a related explanation in step 801, refer to the related explanation in step 401 in the foregoing embodiment. Details are not described herein again.

Step 802: The first network device selects, based on the destination address carried in the second data packet, a tunnel from the plurality of tunnels established between the first site and the second site as a target tunnel.

In this embodiment of this application, for a related explanation in step 802, refer to the related explanation in step 402 in the foregoing embodiment. Details are not described herein again.

Step 803: The first network device determines a flow identifier of a first data flow based on a flow identifier of the second data flow.

In this embodiment of this application, for a related explanation in step 803, refer to the related explanation in step 603 in the foregoing embodiment. Details are not described herein again.

Step 804: The first network device adds a target flow entry to a flow table stored in the first network device.

In this embodiment of this application, for a related explanation in step 804, refer to the related explanation in step 604 in the foregoing embodiment. Details are not described herein again.

Step 805: If the target tunnel is a tunnel established between the first network device and a network device in the second site, the first network device sends the second data packet through the target tunnel.

In this embodiment of this application, for a related explanation in step 805, refer to the related explanation in step 605 in the foregoing embodiment. Details are not described herein again.

Step 805 is for a case in which the target tunnel is the tunnel established between the first network device and the network device in the second site. When the target tunnel is a tunnel between the second network device and the network device in the second site, the first network device may add a tunnel identifier of the target tunnel to the second data packet to obtain a third data packet. The first network device sends the third data packet to the second network device, to indicate the second network device to parse out the second data packet. The second network device determines the flow identifier of the first data flow based on the flow identifier of the second data flow, adds the target flow entry to a flow table stored in the second network device, and sends the second data packet through the target tunnel. A flow identifier included in the currently added target flow entry is the flow identifier of the first data flow. An outbound interface identifier in the currently added target flow entry is an identifier of a second interface, and the second interface is an interface that is in the second network device and that is configured to receive the third data packet.

For an implementation in which the first network device obtains the third data packet and sends the third data packet to the second network device, and the second network device receives the third data packet and parses out the second data packet, refer to the implementation in steps 403 to 405 in the foregoing embodiment. Details are not described herein again.

In this embodiment of this application, for an implementation in which the second network device determines the flow identifier of the first data flow and adds the target flow entry to the stored flow table, refer to the implementation in steps 603 and 604 in the foregoing embodiment. Details are not described herein again.

It should be noted that the foregoing steps 801 to 805 are a case in which the user terminal in the first site sends a data packet to a user terminal in the second site. It should be understood that the user terminal in the second site may alternatively send a data packet to the user terminal in the first site. Therefore, the following describes, by using steps 806 to 808, a case in which the user terminal in the second site sends a data packet to the user terminal in the first site.

Step 806: The first network device receives a first data packet from the second site, where the first data packet belongs to a first data flow.

In this embodiment of this application, for a related explanation in step 806, refer to the related explanation in step 606 in the foregoing embodiment. Details are not described herein again.

Step 807: The first network device searches the flow table stored in the first network device for the target flow entry whose flow identifier is the flow identifier of the first data flow.

In this embodiment of this application, for a related explanation in step 807, refer to the related explanation in step 607 in the foregoing embodiment. Details are not described herein again.

Step 808: If the target flow entry is found, the first network device sends the first data packet through an interface corresponding to the outbound interface identifier in the target flow entry.

In some embodiments, when finding the target flow entry, the first network device may obtain the outbound interface identifier included in the target flow entry, and further send the first data packet based on the interface corresponding to the outbound interface identifier. The interface corresponding to the outbound interface identifier included in the target flow entry may be an interface for communicating with the user terminal in the first site, or may be an interface for communicating with the second network device. Therefore, the following separately describes methods for sending the first data packet in the two cases.

In an embodiment, if the interface corresponding to the outbound interface identifier in the target flow entry is a first-type interface, the first network device sends the first data packet to the user terminal in the first site through the interface corresponding to the outbound interface identifier in the target flow entry, where the first-type interface is an interface for communicating with the user terminal in the first site.

In another embodiment, if the interface corresponding to the outbound interface identifier in the target flow entry is a second-type interface, the first network device sends the first data packet to the second network device through the interface corresponding to the outbound interface identifier in the target flow entry, to indicate the second network device to search the flow table stored in the second network device for the target flow entry, where the second-type interface is an interface for communicating with the second network device.

In some other embodiments, if the first network device does not find the target flow entry, and the first data packet is received through the tunnel established between the first network device and the network device in the second site, the first network device may send the first data packet to the second network device, to indicate the second network device to search the flow table stored in the second network device for the target flow entry. If the second network device finds the target flow entry from the stored flow table, the second network device may send the first data packet to the user terminal in the first site based on the interface corresponding to the outbound interface identifier included in the target flow entry. If the second network device does not find the target flow entry from the stored flow table, the second network device may send the first data packet to the user terminal in the first site based on an interface indicated by a configured local route.

If the first network device does not find the target flow entry, and the first data packet is received through a network link between the first network device and the second network device, the first network device may send the first data packet to the user terminal in the first site based on an interface indicated by a configured local route.

It should be noted that the first network device and the second network device each store a local route, the local route stored in the first network device stores routing information between the first network device and the user terminal in the first site, and the local route stored in the second network device stores routing information between the second network device and the user terminal in the first site. Therefore, when sending the first data packet to the user terminal in the first site, the first network device or the second network device may send the first data packet to the user terminal in the first site based on the local route stored in the first network device or the second network device.

In this embodiment of this application, when receiving the first data packet from the second site, the first network device may search the flow table for the target flow entry whose flow identifier is the flow identifier of the first data flow. The first data flow is the data flow to which the first data packet belongs. The target flow entry is created when the first site sends the second data flow to the second site. A source address of the second data flow is a destination address of the first data flow, and a destination address of the second data flow is a source address of the first data flow. Therefore, the target flow entry exists in the flow table of the first network device only when the second data flow passes through the first network device. Only in this way, can the first network device find the target flow entry, and then send the first data packet through the interface corresponding to the outbound interface identifier in the target flow entry. It can be learned that, in this embodiment of this application, it can be ensured that a packet sent and a packet received with respect to a same application pass through a same network device.

Figure 9:
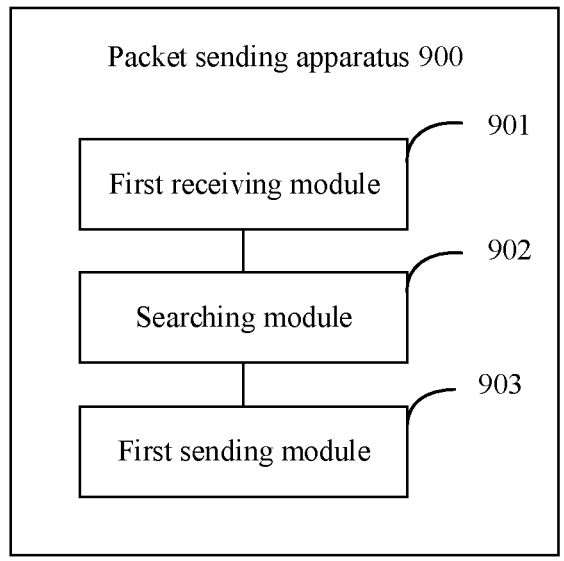
FIG. 9 is a diagram of a packet sending apparatus according to an embodiment of this application.

FIG. 9 is a diagram of a packet sending apparatus according to an embodiment of this application. The packet sending apparatus may be implemented as a part or the entire of a first network device by using software, hardware, or a combination thereof. A plurality of network devices are deployed in a first site. A plurality of tunnels are established between the network devices deployed in the first site and a network device deployed in a second site. The second site is a site that performs data transmission with the first site. The first network device is any one of the plurality of network devices in the first site. As shown in FIG. 9, the apparatus includes a first receiving module 901, a searching module 902, and a first sending module 903.

The first receiving module 901 is configured to receive a first data packet from the second site.

The searching module 902 is configured to search a flow table stored in the first network device for a target flow entry whose flow identifier is a flow identifier of a first data flow. The flow table includes a plurality of flow entries, and each of the plurality of flow entries includes a flow identifier and a corresponding outbound interface identifier. The first data flow is a data flow to which the first data packet belongs, and the target flow entry is created when the first site sends a second data flow to the second site. A source address of the second data flow is a destination address of the first data flow, and a destination address of the second data flow is a source address of the first data flow.

The first sending module 903 is configured to: if the target flow entry is found, send the first data packet through an interface corresponding to an outbound interface identifier in the target flow entry.

Optionally, the apparatus further includes:
a second sending module, configured to: if the target flow entry is not found, and a network device that does not search for the target flow entry still exists in the plurality of network devices, send the first data packet to a second network device, to indicate the second network device to search a flow table stored in the second network device for the target flow entry, where the second network device is a network device that does not search for the target flow entry in the plurality of network devices; and
a third sending module, configured to: if the target flow entry is not found, and the plurality of network devices all search for the target flow entry, send the first data packet through a local route.

Optionally, the first sending module 903 is mainly configured to:
if the interface corresponding to the outbound interface identifier in the target flow entry is a first-type interface, send the first data packet to a user terminal in the first site through the interface corresponding to the outbound interface identifier in the target flow entry, where the first-type interface is an interface for communicating with the user terminal in the first site; or
if the interface corresponding to the outbound interface identifier in the target flow entry is a second-type interface, send the first data packet to a third network device through the interface corresponding to the outbound interface identifier in the target flow entry, to indicate the third network device to search a flow table stored in the third network device for the target flow entry, where the second-type interface is an interface for communicating with another network device in the plurality of network devices, and the third network device is a device in the plurality of network devices that communicates with the first network device through the interface corresponding to the outbound interface identifier in the target flow entry.

Optionally, the apparatus further includes:
a second receiving module, configured to receive a second data packet from the user terminal in the first site, where the second data packet carries a destination address, and the second data packet belongs to the second data flow;
a selection module, configured to select a tunnel from the plurality of tunnels as a target tunnel based on the destination address;
a determining module, configured to determine the flow identifier of the first data flow based on a flow identifier of the second data flow;
a first adding module, configured to add the target flow entry to the flow table stored in the first network device, where the flow identifier in the currently added target flow entry is the flow identifier of the first data flow, the outbound interface identifier in the currently added target flow entry is an identifier of a first interface, and the first interface is an interface that is in the first network device and that is configured to receive the second data packet from the user terminal in the first site; and
a fourth sending module, configured to: if the target tunnel is a tunnel established between the first network device and the network device in the second site, send the second data packet through the target tunnel.

Optionally, the first network device stores a routing table, the routing table includes a plurality of routing entries, and each of the plurality of routing entries includes a site prefix and a corresponding site identifier.

The selection module is mainly configured to:
determine a target routing entry from the routing table based on the destination address carried in the second data packet, where the destination address carried in the second data packet matches a site prefix included in the target routing entry;
determine one or more tunnel entries based on a site identifier included in the target routing entry, where the one or more tunnel entries are tunnel entries corresponding to the tunnels established between the first site and the second site; and
select a tunnel entry from the one or more tunnel entries as a target tunnel entry, and use a tunnel corresponding to the target tunnel entry as the target tunnel.

Optionally, the flow identifier of the second data flow includes source port information and destination port information.

The determining module is mainly configured to:

obtain the flow identifier of the first data flow after exchanging the source port information and the destination port information in the flow identifier of the second data flow.

Optionally, the apparatus further includes:

a second adding module, configured to: if the target tunnel is a tunnel established between a fourth network device and the network device in the second site, add a tunnel identifier of the target tunnel to the second data packet, to obtain a third data packet, where the fourth network device is a network device other than the first network device in the plurality of network devices; and a fifth sending module, configured to send the third data packet to the fourth network device, to indicate the fourth network device to parse out the second data packet, determine the flow identifier of the first data flow based on the flow identifier of the second data flow, add the target flow entry to a flow table stored in the fourth network device, and send the second data packet through the target tunnel, where the flow identifier included in the currently added target flow entry is the flow identifier of the first data flow, the outbound interface identifier in the currently added target flow entry is an identifier of a second interface, and the second interface is an interface that is in the fourth network device and that is configured to receive the third data packet.

Optionally, the first data packet is a data packet received by the first network device through the tunnel established between the first network device and the network device in the second site. Alternatively, the first data packet is a data packet that is received by the first network device and sent by a fifth network device, and the fifth network device is a network device other than the first network device in the plurality of network devices.

Optionally, a network link is established between the plurality of network devices, and the plurality of network devices communicate through the network link. The network link is a physical link or a network tunnel, and the network tunnel includes a GRE tunnel.

In this embodiment of this application, when receiving the first data packet from the second site, the first network device may search the flow table for the target flow entry whose flow identifier is the flow identifier of the first data flow. The first data flow is the data flow to which the first data packet belongs. The target flow entry is created when the first site sends the second data flow to the second site. The source address of the second data flow is the destination address of the first data flow, and the destination address of the second data flow is the source address of the first data flow. Therefore, the target flow entry exists in the flow table of the first network device only when the second data flow passes through the first network device. Only in this way, can the first network device find the target flow entry, and then send the first data packet through the interface corresponding to the outbound interface identifier in the target flow entry. It can be learned that, in this embodiment of this application, it can be ensured that a packet sent and a packet received with respect to a same application pass through a same network device.

Figure 10:
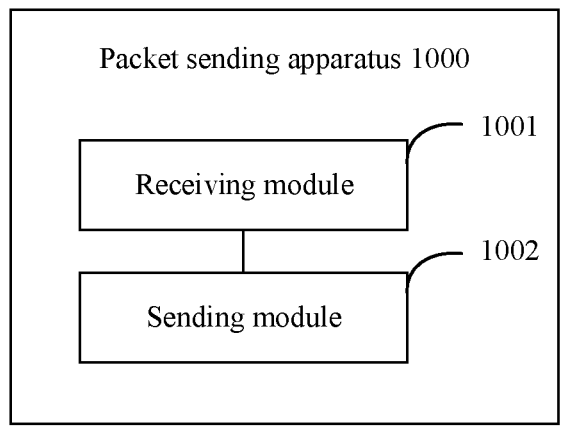
FIG. 10 is a diagram of another packet sending apparatus according to an embodiment of this application.

FIG. 10 is a diagram of another packet sending apparatus according to an embodiment of this application. The packet sending apparatus may be implemented as a part or the entire of a first network device by using software, hardware, or a combination thereof. A plurality of network devices are deployed in the first site, and a network link is established between the plurality of network devices. A plurality of tunnels are established between the network devices deployed in the first site and a network device deployed in a second site. The second site is a site that performs data transmission with the first site. The first network device is any one of the plurality of network devices. As shown in FIG. 10, the apparatus includes a receiving module 1001 and a sending module 1002.

The receiving module 1001 is configured to receive a first data packet from the second site. The first data packet is a data packet received by the first network device through a network link between the first network device and a second network device, and the second network device is a network device in the plurality of network devices that establishes the network link to the first network device.

The sending module 1002 is configured to send the first data packet to a user terminal in the first site.

In this embodiment of this application, because the network link is established between the plurality of network devices in the first site, a tunnel table of the first network device includes not only a tunnel entry corresponding to a tunnel between the first network device and the network device in the second site, but also a tunnel entry corresponding to a tunnel between another network device in the first site and the network device in the second site. Therefore, when the first network device receives a second data packet from the user terminal in the first site, and a selected target tunnel is a tunnel between a third network device and the network device in the second site, the first network device may send the second data packet to the third network device through a network link between the first network device and the third network device. Then, the third network device sends the second data packet to the second site through the target tunnel. In this way, interworking between the first network device and the third network device is implemented, and communication between the first site and the second site can be implemented without creating excessive tunnels.

It should be noted that, when the packet sending apparatus provided in the foregoing embodiment sends a packet, division of the foregoing function modules is merely used as an example for description. In actual application, the foregoing functions may be allocated to different function modules and implemented according to a requirement. In other words, an internal structure of the apparatus may be divided into different function modules to implement all or some of the functions described above. In addition, the packet sending apparatus and packet sending method embodiments provided in the foregoing embodiments belong to a same concept. For an implementation process, refer to the method embodiments. Details are not described herein again.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, all or some of the procedures or the functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like. It should be noted that the computer-readable storage medium mentioned in this application may be a non-volatile storage medium. In other words, the computer-readable storage medium may be a non-transitory storage medium.

In this application, terms such as "first" and "second" are used to distinguish between same items or similar items that have basically same functions. It should be understood that there is no logical or time sequence dependency between "first", "second", and "n$^{th}$", and a quantity and an execution sequence are not limited. It should also be understood that although terms such as first and second are used in the following description to describe various elements, these elements should not be limited by the terms. These terms are merely used to distinguish one element from another element. For example, without departing from the scope of the various examples, a first image may also be referred to as a second image, and similarly, a second image may be referred to as a first image. Both the first image and the second image may be images, and in some cases, may be separate and different images.

The term "at least one" in this application means one or more, and the term "a plurality of" in this application means two or more. For example, "a plurality of second packets" means two or more second packets. The terms "system" and "network" may be used interchangeably in this specification.

It should be understood that the terms used in the descriptions of the various examples in the specification are merely intended to describe specific examples but are not intended to constitute a limitation. The terms "one" ("a" and "an") and "the" of singular forms used in the descriptions of the various examples and the appended claims are also intended to include plural forms, unless otherwise specified in the context clearly.

It should further be understood that, the term "and/or" used in this specification indicates and includes any or all combinations of one or more items in associated listed items. The term "and/or" in this specification describes an association for describing associated objects and represents that three relationships may exist. For example, A and/or B may represent the following three cases: Only A exists, both A and B exist, and only B exists. In addition, the character "/" in this application usually indicates an "or" relationship between the associated objects.

It should further be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should be understood that determining B based on A does not mean that B is determined based on only A. B may alternatively be determined based on A and/or other information.

It should further be understood that the term "include" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or their components not excluded.

It should further be understood that, the term "and/or" used in this specification indicates and includes any or all combinations of one or more items in associated listed items. The term "and/or" in this specification describes an association for describing associated objects and represents that three relationships may exist. For example, A and/or B may represent the following three cases: Only A exists, both A and B exist, and only B exists. In addition, the character "/" in this application usually indicates an "or" relationship between the associated objects.

It should further be understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

It should be understood that "one embodiment", "an embodiment", or "a possible implementation" mentioned throughout specification means that particular features, structures, or characteristics related to the embodiments or implementations are included in at least one embodiment of this application. Therefore, "in one embodiment", "in an embodiment", or "in a possible implementation" appearing throughout this specification does not necessarily refer to a same embodiment. In addition, these particular features, structures, or characteristics may be combined in one or more embodiments in any appropriate manner.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A first network device in a plurality of network devices, the plurality of network devices are deployed in a first site, a plurality of tunnels are established between the plurality of network devices deployed in the first site and a second network device deployed in a second site, and the second site performs data transmission with the first site, the first network device comprising:
    a memory storing instructions and storing a flow table, the flow table comprising a plurality of flow entries, each flow entry of the plurality of flow entries comprises a flow identifier and a corresponding outbound interface identifier; and
    at least one processor in communication with the memory, the at least one processor configured, upon execution of the instructions, to perform the following steps:
        receive a first data packet of a first data flow from the second site;
        search the flow table for a target flow entry, wherein the target flow entry includes a flow identifier of the first data flow, and wherein the target flow entry is created when the first site sends a second data flow to the second site;
        determine the target flow entry is not found;

if a network device that does not search for the target flow entry still exists in the plurality of network devices, then send the first data packet to a second network device to indicate that the second network device search a flow table for the target flow entry, the flow table being stored in the second network device, the second network device being a network device that does not search for the target flow entry in the plurality of network devices; or if the plurality of network devices all search unsuccessfully for the target flow entry, then send the first data packet through a local route.

2. The network device according to claim 1, wherein the at least one processor further executes the instructions to:

if the interface corresponding to the outbound interface identifier in the target flow entry is a first-type interface, send the first data packet to a user terminal in the first site through the interface corresponding to the outbound interface identifier in the target flow entry, wherein the first-type interface is an interface for communicating with the user terminal in the first site; or if the interface corresponding to the outbound interface identifier in the target flow entry is a second-type interface, send the first data packet to a third network device in the plurality of network devices through the interface corresponding to the outbound interface identifier in the target flow entry to indicate the third network device search a flow table stored in the third network device for the target flow entry, wherein the second-type interface is an interface for communicating with another network device in the plurality of network devices, and the third network device communicates with the first network device through the interface corresponding to the outbound interface identifier in the target flow entry.

3. The network device according to claim 1, wherein the at least one processor further executes the instructions to:

receive a second data packet from a user terminal in the first site, wherein the second data packet carries a destination address, and the second data packet belongs to the second data flow;

select a tunnel from the plurality of tunnels as a target tunnel based on the destination address;

determine the flow identifier of the first data flow based on the flow identifier of the second data flow;

add the target flow entry to the flow table stored in the first network device, wherein the flow identifier in the currently added target flow entry is the flow identifier of the first data flow, the outbound interface identifier in the currently added target flow entry is an identifier of a first interface, and the first interface is an interface that is in the first network device and that is configured to receive the second data packet from the user terminal in the first site; and if the target tunnel is a tunnel established between the first network device and the network device in the second site, send the second data packet through the target tunnel.

4. The network device according to claim 3, wherein the memory stores a routing table, the routing table comprising a plurality of routing entries, each of the plurality of routing entries comprises a site prefix and a corresponding site identifier;

wherein the at least one processor further executes the instructions to:

determine a target routing entry from the routing table based on the destination address, the destination address matching a site prefix comprised in the target routing entry;

determine one or more tunnel entries based on a site identifier comprised in the target routing entry, the one or more tunnel entries correspond to the tunnels established between the first site and the second site; and select a tunnel entry from the one or more tunnel entries as a target tunnel entry, and using a tunnel corresponding to the target tunnel entry as the target tunnel.

5. The network device according to claim 3, wherein the flow identifier of the second data flow comprises source port information and destination port information; and wherein the at least one processor further executes the instructions to:

obtain the flow identifier of the first data flow after exchanging the source port information and the destination port information in the flow identifier of the second data flow.

6. The network device according to claim 3, wherein the at least one processor further executes the instructions to:

if the target tunnel is a tunnel established between a fourth network device and the network device in the second site, add a tunnel identifier of the target tunnel to the second data packet to obtain a third data packet, wherein the fourth network device is a network device other than the first network device in the plurality of network devices;

send the third data packet to the fourth network device to indicate the fourth network device;

parse out the second data packet;

determine the flow identifier of the first data flow based on the flow identifier of the second data flow;

add the target flow entry to a flow table stored in the fourth network device; and send the second data packet through the target tunnel;

wherein the flow identifier comprised in the currently added target flow entry is the flow identifier of the first data flow, the outbound interface identifier in the currently added target flow entry is an identifier of a second interface, and the second interface is an interface that is in the fourth network device and that is configured to receive the third data packet.

7. The network device according to claim 1, wherein:

the first data packet is received by the first network device through the tunnel established between the first network device and the network device in the second site; or the first data packet is received by the first network device and sent by a fifth network device, and the fifth network device is a network device other than the first network device in the plurality of network devices.

8. The network device according to claim 1, wherein a network link is established between the plurality of network devices, the plurality of network devices communicate through the network link, the network link is a physical link or a network tunnel, and the network tunnel comprises a generic routing encapsulation (GRE) tunnel.

9. A network system comprising a plurality of network devices, the plurality of network devices are deployed in a first site, a plurality of tunnels are established between the network devices deployed in the first site and a network device deployed in a second site, and the second site performs data transmission with the first site, the network system comprising:

a first network device of the plurality of network devices is configured to:
- receive a first data packet of a first data flow from the second site;
- search a flow table stored in the first network device for a target flow entry, wherein the target flow entry includes a flow identifier of the first data flow, wherein the flow table comprises a plurality of flow entries and each flow entry of the plurality of flow entries comprises a flow identifier and a corresponding outbound interface identifier, and wherein the target flow entry is created when the first site sends a second data flow to the second site;
- determine the target flow entry is not found;
- if a network device that does not search for the target flow entry still exists in the plurality of network devices, then send the first data packet to a second network device to indicate that the second network device search a flow table for the target flow entry, the flow table being stored in the second network device, the second network device being a network device that does not search for the target flow entry in the plurality of network devices; or
- if the plurality of network devices all search unsuccessfully for the target flow entry, then send the first data packet through a local route.

10. The network system according to claim 9, wherein the first network device is further configured to:
- if the interface corresponding to the outbound interface identifier in the target flow entry is a first-type interface, send the first data packet to a user terminal in the first site through the interface corresponding to the outbound interface identifier in the target flow entry, the first-type interface being for communicating with the user terminal in the first site; or
- if the interface corresponding to the outbound interface identifier in the target flow entry is a second-type interface, send the first data packet to a third network device through the interface corresponding to the outbound interface identifier in the target flow entry to indicate the third network device search a flow table stored in the third network device for the target flow entry, the second-type interface being an interface for communicating with another network device in the plurality of network devices, and the third network device is in the plurality of network devices that communicates with the first network device through the interface corresponding to the outbound interface identifier in the target flow entry.

11. The network system according to claim 9, wherein the first network device is further configured to:
- receive a second data packet from the user terminal in the first site, wherein the second data packet carries a destination address, and the second data packet belongs to the second data flow;
- select a tunnel from the plurality of tunnels as a target tunnel based on the destination address;
- determine the flow identifier of the first data flow based on the flow identifier of the second data flow;
- add the target flow entry to the flow table stored in the first network device, the flow identifier in the currently added target flow entry comprises the flow identifier of the first data flow, the outbound interface identifier in the currently added target flow entry comprises a first interface identifier of a first interface, and the first interface is in the first network device and is configured to receive the second data packet from the user terminal in the first site; and
- if the target tunnel is a tunnel established between the first network device and the network device in the second site, send the second data packet through the target tunnel.

12. The network system according to claim 11, wherein the first network device stores a routing table, the routing table comprises a plurality of routing entries, and each of the plurality of routing entries comprises a site prefix and a corresponding site identifier; and the first network device is further configured to:
- determine a target routing entry from the routing table based on the destination address, the destination address matching a site prefix comprised in the target routing entry;
- determine one or more tunnel entries based on a site identifier comprised in the target routing entry, the one or more tunnel entries correspond to the tunnels established between the first site and the second site; and
- select a tunnel entry from the one or more tunnel entries as a target tunnel entry and use a tunnel corresponding to the target tunnel entry as the target tunnel.

13. The network system according to claim 11, wherein the flow identifier of the second data flow comprises source port information and destination port information; and the first network device is further configured to:
- obtain the flow identifier of the first data flow after exchanging the source port information and the destination port information in the flow identifier of the second data flow.

14. The network system according to claim 11, wherein the first network device is further configured to:
- if the target tunnel is established between a fourth network device and the network device in the second site, add a target tunnel identifier of the target tunnel to the second data packet to obtain a third data packet, wherein the fourth network device is a network device other than the first network device in the plurality of network devices;
- send the third data packet to the fourth network device to indicate the fourth network device:
- parse out the second data packet;
- determine the flow identifier of the first data flow based on the flow identifier of the second data flow;
- add the target flow entry to a flow table stored in the fourth network device; and
- send the second data packet through the target tunnel;

wherein the flow identifier comprised in the currently added target flow entry comprises the flow identifier of the first data flow, the outbound interface identifier in the currently added target flow entry comprises an identifier of a second interface, and the second interface is in the fourth network device and is configured to receive the third data packet.

15. The network system according to claim 9, wherein the first data packet is received by the first network device through the tunnel established between the first network device and the network device in the second site; or the first data packet is received by the first network device and sent by a fifth network device and the fifth network device is a network device other than the first network device in the plurality of network devices.

16. The network system according to claim 9, wherein a network link is established between the plurality of network devices, the plurality of network devices communicate through the network link, the network link is a physical link or a network tunnel, and the network tunnel comprises a generic routing encapsulation (GRE) tunnel.

17. The network system according to claim 9, wherein the first network device is further configured to:
- receive a second data packet from the second site, the second data packet is received by the first network device through a network link between the first network device and a second network device, the first network device comprises one of the plurality of network devices, and the second network device is in the plurality of network devices that establishes the network link to the first network device; and
- send the second data packet to a user terminal in the first site.

* * * * *